(12) United States Patent
Berg et al.

(10) Patent No.: US 10,921,809 B2
(45) Date of Patent: Feb. 16, 2021

(54) AUTONOMOUS SAILING VESSEL

(71) Applicant: Autonomous Marine Systems, Inc., Somerville, MA (US)

(72) Inventors: Lowell J. Berg, Cambridge, MA (US); Eamon Carrig, Somerville, MA (US); Shawn Dooley, Somerville, MA (US); Ravijit Paintal, Boston, MA (US)

(73) Assignee: Autonomous Marine Systems, Inc., Somerville, MA (US)

( * ) Notice: Subject to any disclaimer, the term of this patent is extended or adjusted under 35 U.S.C. 154(b) by 0 days.

(21) Appl. No.: 16/402,078

(22) Filed: May 2, 2019

(65) Prior Publication Data

US 2019/0339700 A1 Nov. 7, 2019

Related U.S. Application Data

(60) Provisional application No. 62/665,995, filed on May 2, 2018, provisional application No. 62/666,000, filed (Continued)

(51) Int. Cl.
  *G05D 1/02* (2020.01)
  *B63B 39/03* (2006.01)
  (Continued)

(52) U.S. Cl.
  CPC ........... *G05D 1/0206* (2013.01); *B63B 39/03* (2013.01); *B63B 39/06* (2013.01); *B63H 9/069* (2020.02);
  (Continued)

(58) Field of Classification Search
  CPC .... B63B 1/00; B63B 1/10; B63B 1/12; B63B 1/125; B63B 43/00; B63B 39/00; B63B 39/03; B63B 39/06; B63H 9/00; B63H 9/02; B63H 9/06; B63H 9/0685; B63H 25/38; B63H 25/00; B63H 9/061; G05D 1/0206; G01H 3/00; G01S 17/95; G01V 1/00
  (Continued)

(56) References Cited

U.S. PATENT DOCUMENTS

| 4,610,212 A | 9/1986 | Petrovich |
| 5,179,905 A | 1/1993 | Hossfield et al. |

(Continued)

OTHER PUBLICATIONS

Alsherif, M. et al., "Design of an Autonomous Robot Operating in Different Environments", Proceedings of the 18th Int. AMME Conference, pp. 1-21 (Apr. 2018).

(Continued)

*Primary Examiner* — Lars A Olson
(74) *Attorney, Agent, or Firm* — Knobbe Martens Olson & Bear, LLP

(57) ABSTRACT

An autonomous sailing vessel may include a hull, a mast, a sail, and a rudder. The mast may be mechanically coupled to the hull. The sail may be mechanically coupled to the mast. The rudder may be mechanically coupled to the hull. A heading of the autonomous sailing vessel may be regulated by actively controlling the rudder without actively controlling the sail. Alternatively or additionally, the autonomous sailing vessel may include an anticapsize stabilizer tank, a lidar system, and/or marine mammal monitoring and identification.

19 Claims, 17 Drawing Sheets

Related U.S. Application Data on May 2, 2018, provisional application No. 62/681,378, filed on Jun. 6, 2018, provisional application No. 62/723,577, filed on Aug. 28, 2018.

(51) Int. Cl.
  *B63B 39/06* (2006.01)
  *B63H 25/38* (2006.01)
  *B63H 9/06* (2020.01)
  *G01S 17/95* (2006.01)
  *G01H 3/00* (2006.01)
  *B63H 9/069* (2020.01)

(52) U.S. Cl.
  CPC ............ *B63H 25/38* (2013.01); *G01H 3/00* (2013.01); *G01S 17/95* (2013.01); *B63B 2211/02* (2013.01)

(58) Field of Classification Search
  USPC ............. 114/39.21, 39.23, 39.26, 39.3
  See application file for complete search history.

(56) References Cited

U.S. PATENT DOCUMENTS

| | | | |
|---|---|---|---|
| 7,789,723 B2* | 9/2010 | Dane | B63B 35/00 |
| | | | 114/39.21 |
| 8,391,102 B2 | 3/2013 | Holo | |
| 8,973,511 B2 | 3/2015 | Holemans | |
| 9,003,986 B2* | 4/2015 | Jenkins | B63B 1/12 |
| | | | 114/39.23 |
| 9,616,984 B2 | 4/2017 | Peddie | |
| 9,816,812 B2 | 11/2017 | Huntsberger et al. | |
| 9,834,290 B2 | 12/2017 | Jenkins et al. | |
| 2009/0218297 A1* | 9/2009 | Glessner | B63B 13/02 |
| | | | 210/767 |
| 2012/0031319 A1 | 2/2012 | Jarke | |
| 2013/0239861 A1 | 9/2013 | Gizara | |
| 2015/0260860 A1* | 9/2015 | L'Her | G01V 1/001 |
| | | | 367/131 |
| 2015/0346730 A1 | 12/2015 | Stephens et al. | |
| 2016/0147223 A1* | 5/2016 | Edwards | B63B 1/121 |
| | | | 701/2 |
| 2017/0097639 A1 | 4/2017 | Edwards et al. | |
| 2018/0072393 A1 | 3/2018 | Jenkins et al. | |

OTHER PUBLICATIONS

International Search Report and Written Opinion dated Sep. 24, 2019 as received in Application No. PCT/US2019/030460.

* cited by examiner

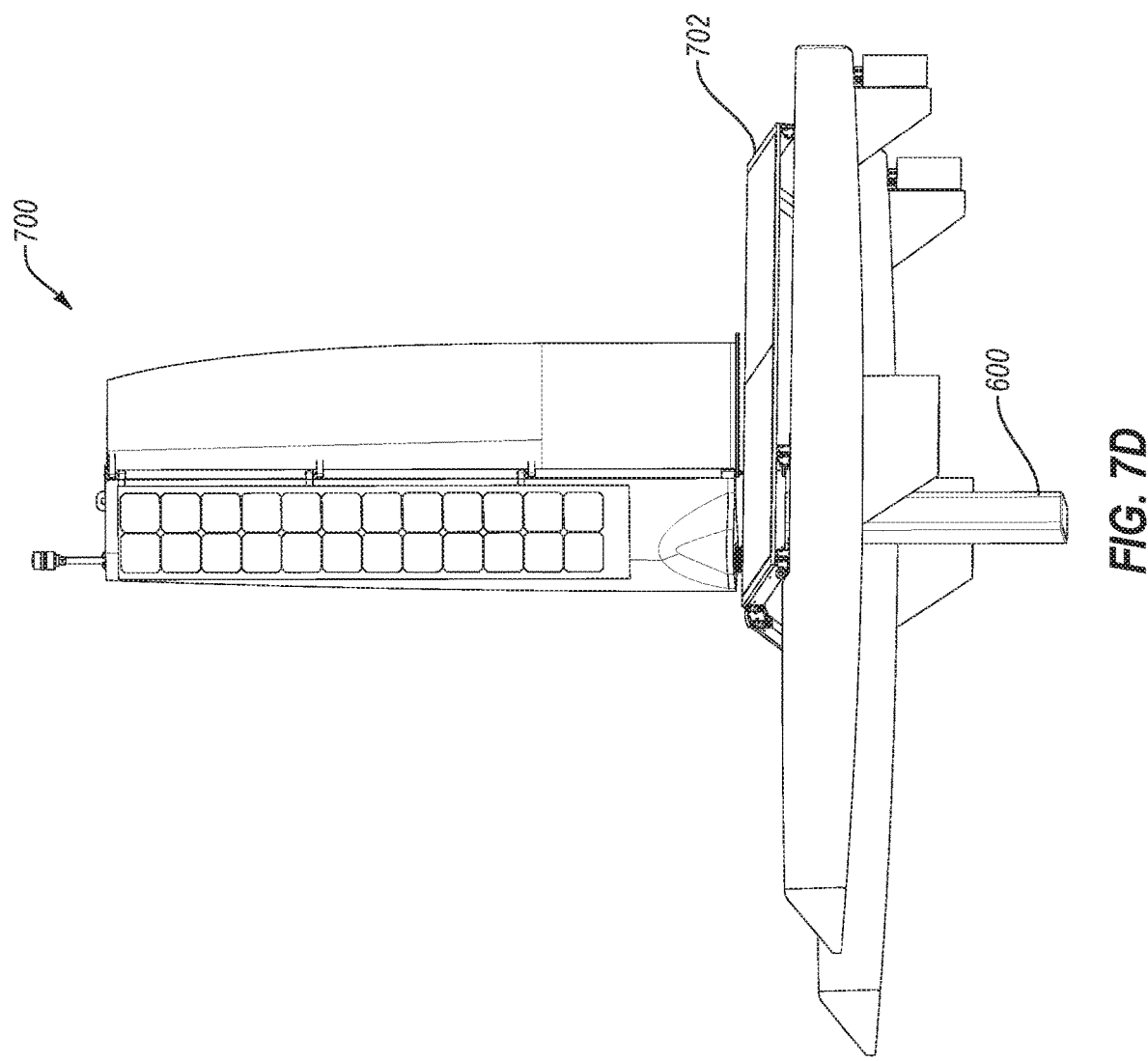

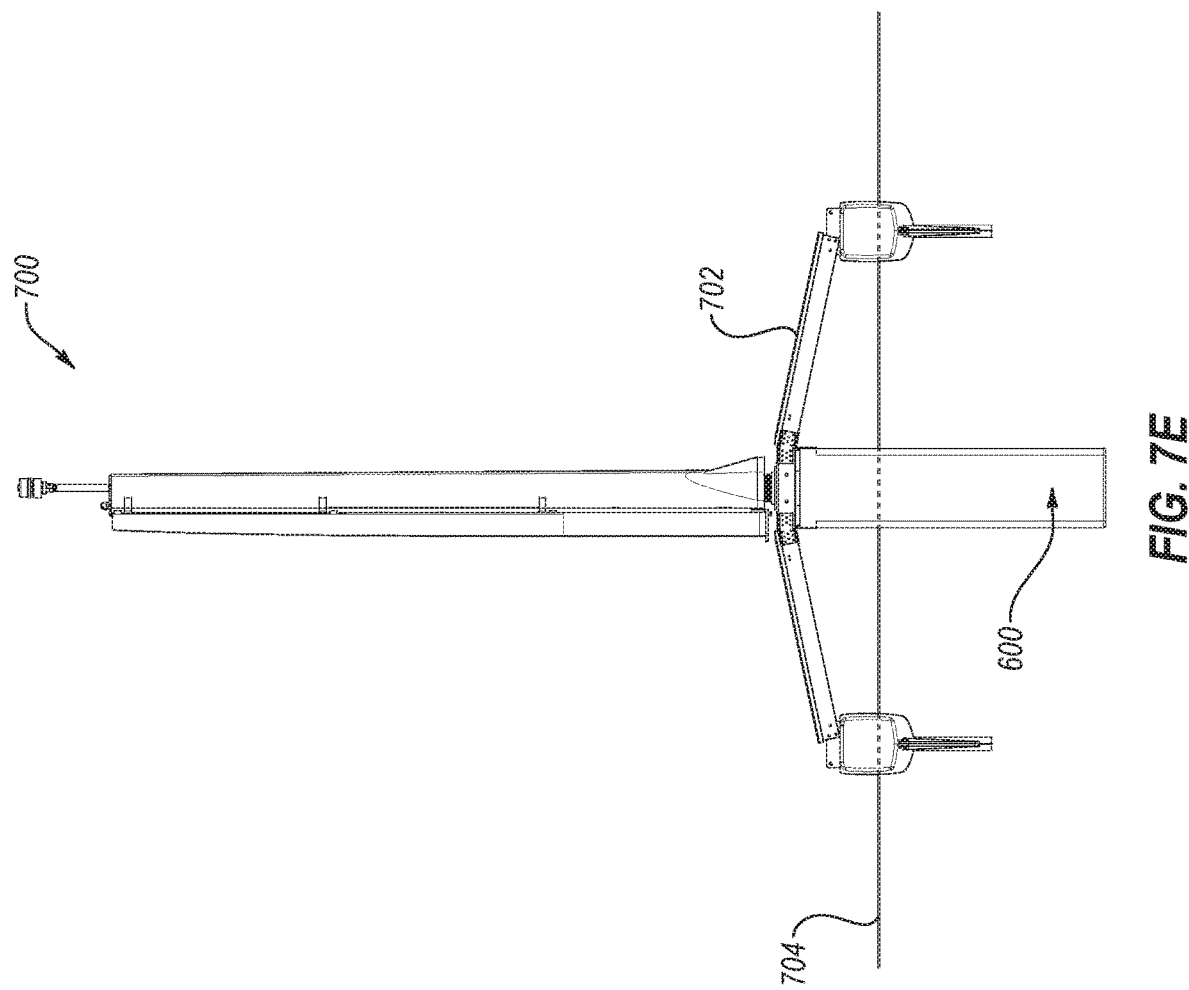

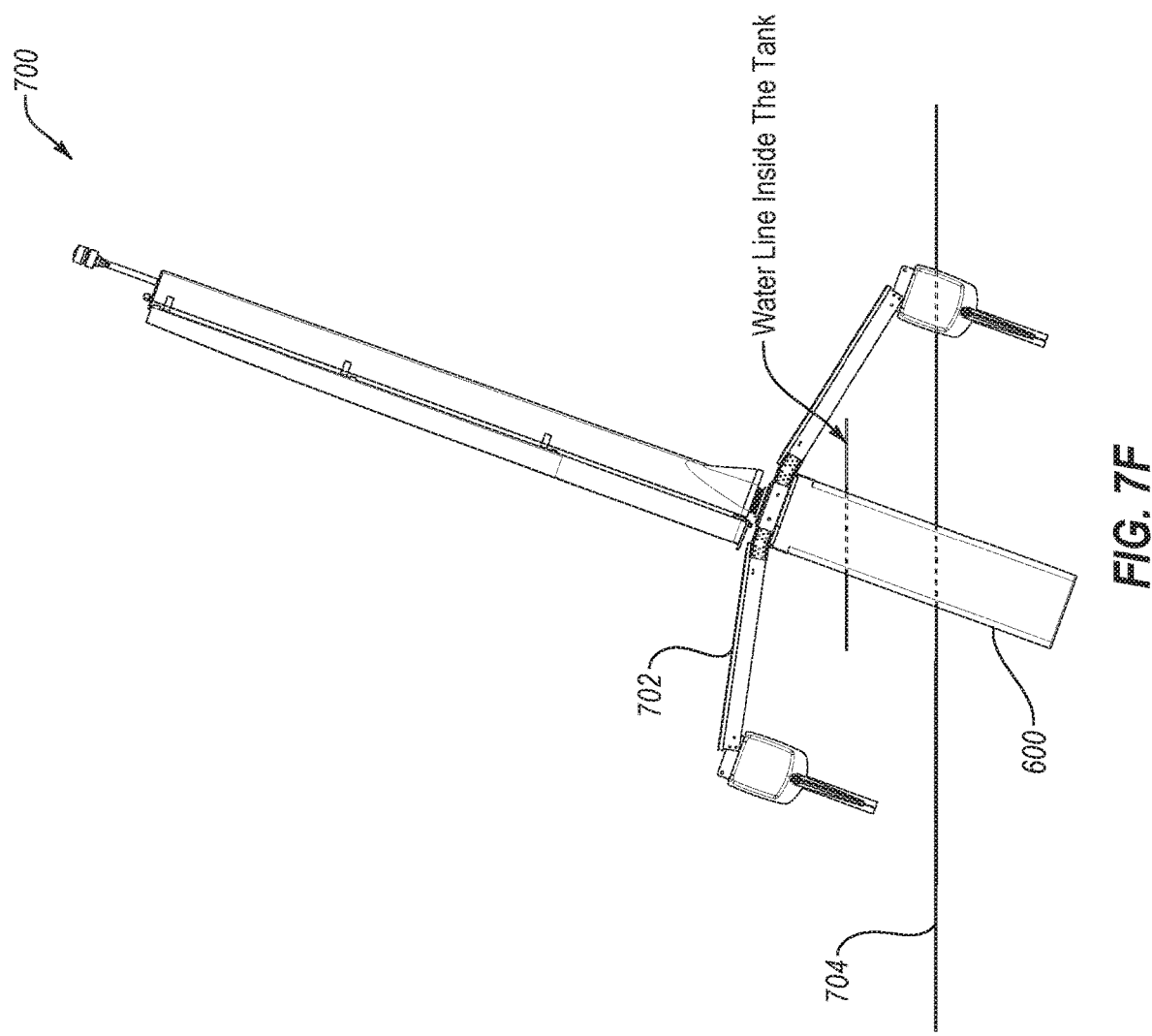

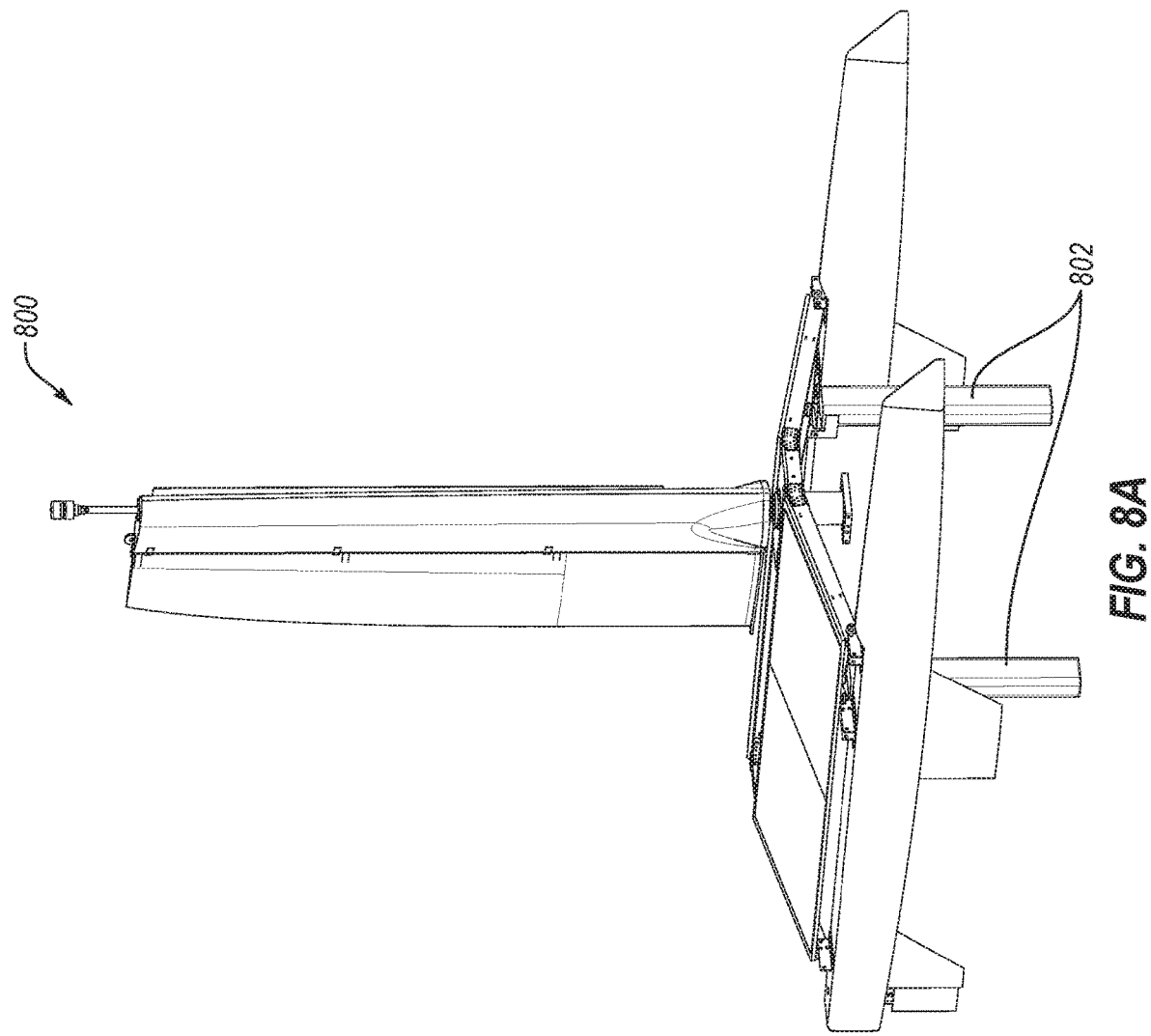

AUTONOMOUS SAILING VESSEL

CROSS-REFERENCE TO RELATED APPLICATION

This patent application claims the benefit of and priority to U.S. Provisional App. No. 62/665,995 filed May 2, 2018; U.S. Provisional App. No. 62/666,000 filed May 2, 2018; U.S. Provisional App. No. 62/681,378 filed Jun. 6, 2018; and U.S. Provisional App. No. 62/723,577 filed Aug. 28, 2018. Each of the application 62/665,995, the application 62/666,000, the application 62/681,378, and the application 62/723,577 is incorporated herein by reference.

FIELD

The embodiments discussed herein are related to an autonomous sailing vessel.

BACKGROUND

Unless otherwise indicated herein, the materials described herein are not prior art to the claims in the present application and are not admitted to be prior art by inclusion in this section.

The world's oceans are among the most difficult and expensive regions to monitor, due in part to the size of the area encompassed by the oceans and the time and resources required to reach remote areas. It is estimated that it would cost about $10,000-100,000 per line kilometer to provide a manned monitoring vessel in a remote area, such as the South Pacific. Accordingly, very little oceanographic monitoring is actually performed. In like manner, aerial reconnaissance can be very expensive, and very limited in terms of the range and area that can be monitored during each flight. Manned monitoring vessels or aircraft are also subject to adverse weather conditions, which may limit the times that the monitoring may be conducted, or may place the monitoring personnel at increased risk. Satellite imaging provides some information regarding the condition on the surface and above the ocean, but is substantially limited with regard to conditions under the ocean surface.

There is increasing need to provide more detailed oceanographic monitoring. Concerns abound, for example, regarding increasing levels of hydrocarbons and other materials that are harmful to marine life. In coastal areas, nitrogen runoff from fertilized lands is particularly of concern. The monitoring of fish in particular habitats may provide an early-warning of increasing mortality or decreasing birth rate. In like manner, in the event of an environmental disaster, such as the Gulf oil spill, an accurate monitoring of the extent of the effects of the disaster can aid rescue and repair operations.

Beyond environmental concerns, the increase in pirate activities in certain areas of the world is of concern, as well as the increase in drug trafficking via the seas. Manned surveillance is limited in range and area, and in some cases, dangerous to the surveillance crew.

In addition to addressing particular concerns, the monitoring of oceanographic conditions may enhance our ability to forecast storms and tsunamis, and may enhance marine safety by warning vessels of particularly hazardous conditions. In some cases, the availability of remote monitors on the seas in a region may enhance search and rescue operations in that region.

Typically, ocean data is collected by means and methods of single vehicle sensor deployments, and each of these methods have their own drawbacks. For example, a manned oceangoing vessel is expensive, slow, but has the benefit of direct measurement. Aerial vehicles, which are typically manned for survey, are expensive, rely on indirect measurement, but are relatively fast. Satellites are also used for collecting ocean data, but are very expensive, inflexible and provide only indirect measurement over large areas. Maritime buoys are also employed, and while individually less expensive than other options, they typically must be manually deployed to a location.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to an autonomous sailing vessel.

In an example embodiment, an autonomous sailing vessel may include a hull, a mast, a sail, and a rudder. The mast may be mechanically coupled to the hull. The sail may be mechanically coupled to the mast. The rudder may be mechanically coupled to the hull. A heading of the autonomous sailing vessel may be regulated by actively controlling the rudder without actively controlling the sail.

In another example embodiment, an autonomous sailing vessel may include a hull, a mast, a sail, a rudder, and a lidar system. The mast may be mechanically coupled to the hull. The sail may be mechanically coupled to the mast. The rudder may be mechanically coupled to the hull. The lidar system may be mechanically coupled to the hull. The autonomous sailing vessel may further include a second mast mechanically coupled to the hull and a second sail mechanically coupled to the second mast, the lidar system positioned between the mast and sail spaced apart from the lidar system in a first direction and the second mast and the second sail spaced apart from the lidar system in a second direction opposite the first direction. Alternatively, the lidar system may be positioned fore or aft of the mast and the sail in close proximity to the mast or sail.

In another example embodiment, an autonomous sailing vessel may include a hull, a mast, a sail, a rudder, an acoustic sensor, a processor device, and an electrical power storage device. The mast may be mechanically coupled to the hull. The sail may be mechanically coupled to the mast. The rudder may be mechanically coupled to the hull. The acoustic sensor may be coupled to the hull and may be configured to generate a data signal that represents an underwater acoustic signal. The processor device may be coupled to the hull and may be communicatively coupled to the acoustic sensor and may be configured to analyze the data signal to identify a marine mammal vocalization from the underwater acoustic signal and to identify a corresponding marine mammal species responsible for the marine mammal vocalization. The electrical power storage device may be coupled to the hull and may be electrically coupled to the processor device and may be configured to power the processor device.

In another example embodiment, an autonomous sailing vessel may include a hull, a mast, a sail, a rudder, and a stabilizer tank. The mast may be mechanically coupled to the hull. The sail may be mechanically coupled to the mast. The rudder may be mechanically coupled to the hull. The stabilizer tank may be movable relative to the hull between a stowed position in which the stabilizer tank is substantially above a waterline and a deployed position in which the stabilizer tank is substantially below the waterline.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 7A-7F illustrate an example catamaran that includes the stabilizer tank of FIG. 6; and FIGS. 8A and 8B illustrate an example catamaran that includes two stabilizer tanks, all arranged in accordance with at least one embodiment described herein.

DETAILED DESCRIPTION OF SOME EXAMPLE EMBODIMENTS

Singular forms used herein, such as "a", "an", and "the" may include plural referants unless context clearly dictates otherwise. For example, reference to "a component surface" may include reference to one or more of such surfaces.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
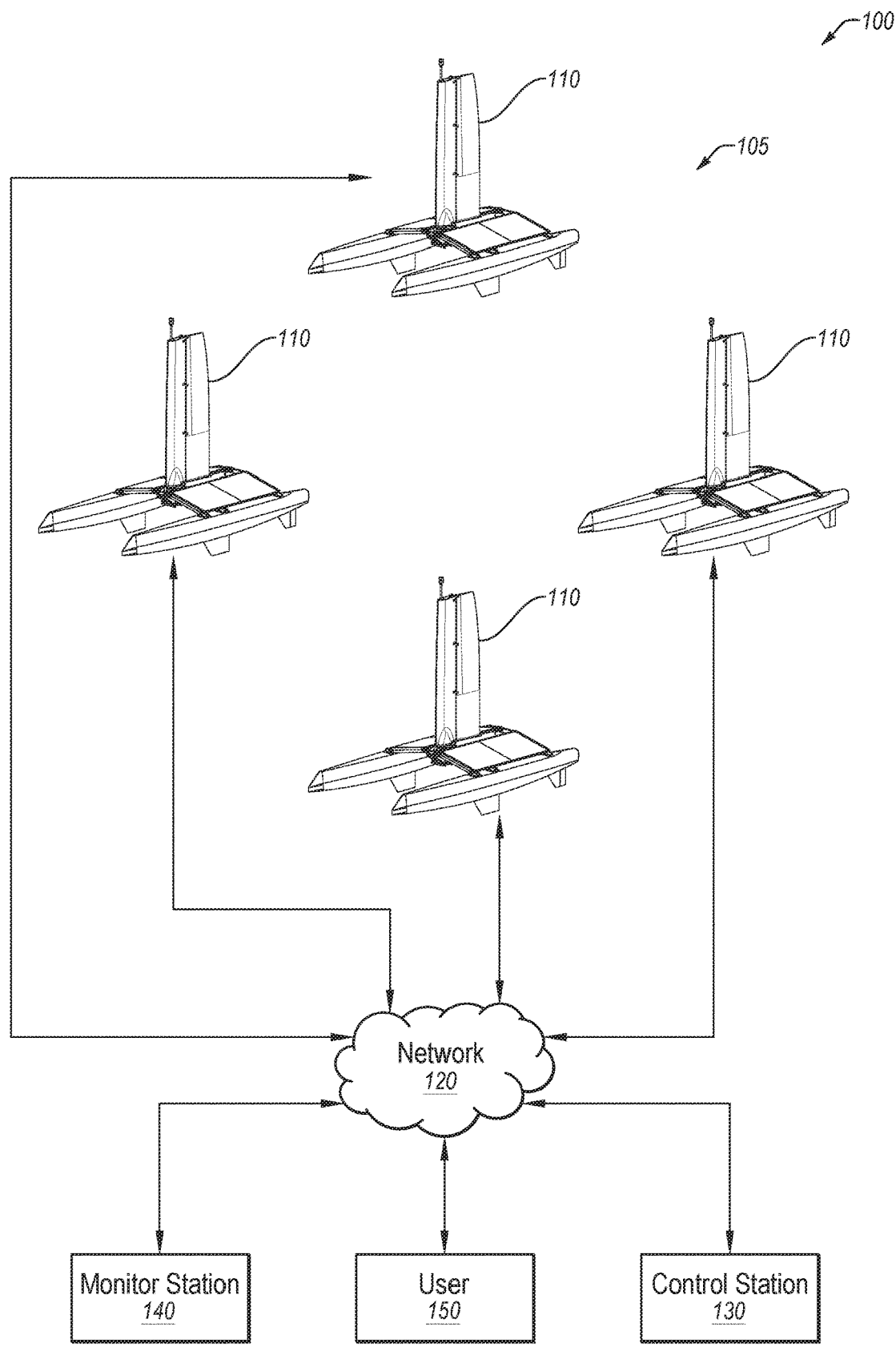
FIG. 1 illustrates an example system to conduct marine monitoring.

FIG. 1 illustrates an example system 100 to conduct marine monitoring, arranged in accordance with at least one embodiment described herein. The system 100 may include a fleet 105 of autonomous sailing vessels 110, a network 120, a control station 130, and a monitor station 140. The foregoing elements may be communicatively connected by or at least through each other for passing commands, information, and data among potentially other things.

The fleet 105 of autonomous sailing vessels 110 may be provided in communication with a user 150, the monitor station 140, and the control station 130 via the network 120. In general, the network 120 may include one or more wide area networks (WANs), local area networks (LANs), and/or satellite, internet, and/or cellular connections that enable the autonomous sailing vessels 110, the control station 130, the monitor station 140, and/or the user 150 (e.g., via a suitable user device such as laptop, desktop, tablet, or mobile computer) to communicate with each other. In some embodiments, the network 120 may include the Internet, including a global internetwork formed by logical and physical connections between multiple WANs and/or LANs. Alternately or additionally, the network 120 may include one or more cellular radio frequency (RF) networks, satellite networks, and/or one or more wired and/or wireless networks such as 802.xx networks, Bluetooth access points, wireless access points, Internet Protocol (IP)-based networks, or other wired and/or wireless networks. The network 120 may also include servers that enable one type of network to interface with another type of network.

A provider of the fleet 105 of autonomous sailing vessels 110 may configure the autonomous sailing vessels 110 based on a particular customer's requirements for mission-specific monitoring tasks. The fleet's 105 movements and/or movements of individual ones of the autonomous sailing vessels 110 may be controlled by the provider, based on directives from the customer, and the collection of mission-specific information may be controlled, at least in part, by the customer. The provider and/or the customer is represented in FIG. 1 as the user 150.

The fleet 105 of autonomous sailing vessels 110 may be deployed to a region to be monitored in communication with the control station 130 through the network 120 to receive control information and/or to transmit monitor and other information. Typically, communication with each of the autonomous sailing vessels 110 may be via a satellite communication network that may be include in the network 120, although other forms of communication may be used. For example, in missions that are in proximity of a coast, communications may be provided via cellular networks, using on-shore cell towers of the network 120 which can incorporate other network communication systems, such as the Internet, for communication between the control station 130 and one or more of the autonomous sailing vessels 110 of the fleet 105. Optionally, different communication systems may be used for different applications. For example, navigation information may be communicated via one system, and monitoring information may be communicated via another system. The control system 130 may communicate control information to the fleet 105 of autonomous sailing vessels 110 and may receive feedback information from the autonomous sailing vessels 110, via, for example, the Internet included in the network 120. The monitor station 140 may receive monitored information from the autonomous sailing vessels 110, and may optionally be configured to control particular monitoring equipment.

Depending upon the communication system used, messages to and/or from the autonomous sailing vessels 110 may provide destination information. For example, if the Internet is used, the messages may communicate a destination URL address, or set of addresses, to deliver the message to an internet interface between the satellite communication system and the Internet. If the cellular network is used, the messages may be text messages that are addressed to one or more destinations. In an example embodiment of the command communication system, each of the autonomous sailing vessels 110 may have an individual communication address, and the fleet 105 may have a fleet communication address, allowing for control of the fleet 105 as a whole, as well as control of individual autonomous sailing vessels 110 within the fleet 105. The control may generally be in the form of navigation commands and monitoring commands.

The structure of the commands may depend upon the capabilities provided in the autonomous sailing vessels 110. For example, if the autonomous sailing vessels 110 include navigational software, the control station 130 may only need to communicate navigational information such as target location (e.g., latitude, longitude) and the autonomous sailing vessels 110 may determine the direction in which to travel and the vessel commands (e.g., rudder control) to proceed in that direction. In other embodiments, the control station 130 may communicate the direction to travel, and the autonomous sailing vessels 110 may determine the vessel commands; or, the control station 130 may communicate the vessel commands to each autonomous sailing vessel 110. The command structure may range from basic vessel commands to the highest supported navigation commands, allowing the operator at the control station 130 to exercise situation-dependent control of the fleet 105 and individual autonomous sailing vessels 110 within the fleet 105.

Each autonomous sailing vessel 110 may include a navigation monitor to provide location and tracking information, such as a GPS system that may provide the autonomous sailing vessel's 110 current location and the speed and direction of travel. This information may generally be communicated to the control station 130, as well as being used by a control system within the autonomous sailing vessel 110 to facilitate vessel control. For example, the tracking information may be used to control the path of the vessel to achieve an optimal "velocity made good" (VMG) toward the target area based on the current wind conditions, including traveling on different "tacks" (bearings and headings relative to the wind) to achieve an overall optimal speed in direction of the target ("tacking" to the target).

Each autonomous sailing vessel 110 may also include a variety of monitoring equipment; in some applications different autonomous sailing vessels 110 within the fleet 105 may be outfitted with different monitoring equipment. The vessel monitoring equipment may include, for example, the aforementioned GPS (Global Positioning System), inertial measurement units (IMUs), temperature sensors, wind direction and speed sensors, water speed sensors, water velocity sensors, cameras, and/or hull-speed sensors. The mission-specific monitoring equipment may include video and infrared cameras, scanners, acoustic sensors and hydrophones, conductivity sensors, oxygen and other gas sensors, barometers, opto-fluidic water quality sensors, hydrocarbon detectors, Geiger counters, salinity and pH sensors, pressure sensors, and/or any other suitable sensor. The monitored information may be communicated to the monitor station 140 and/or the control station 130 continuously, periodically, on demand, or when triggered. The triggering may be based on changes of monitored values, changes of location, or other suitable triggers. The mission-specific monitored information may be provided to one or more monitor stations 140, and the monitor station 140 may control some or all of the monitoring equipment.

Figure 2:
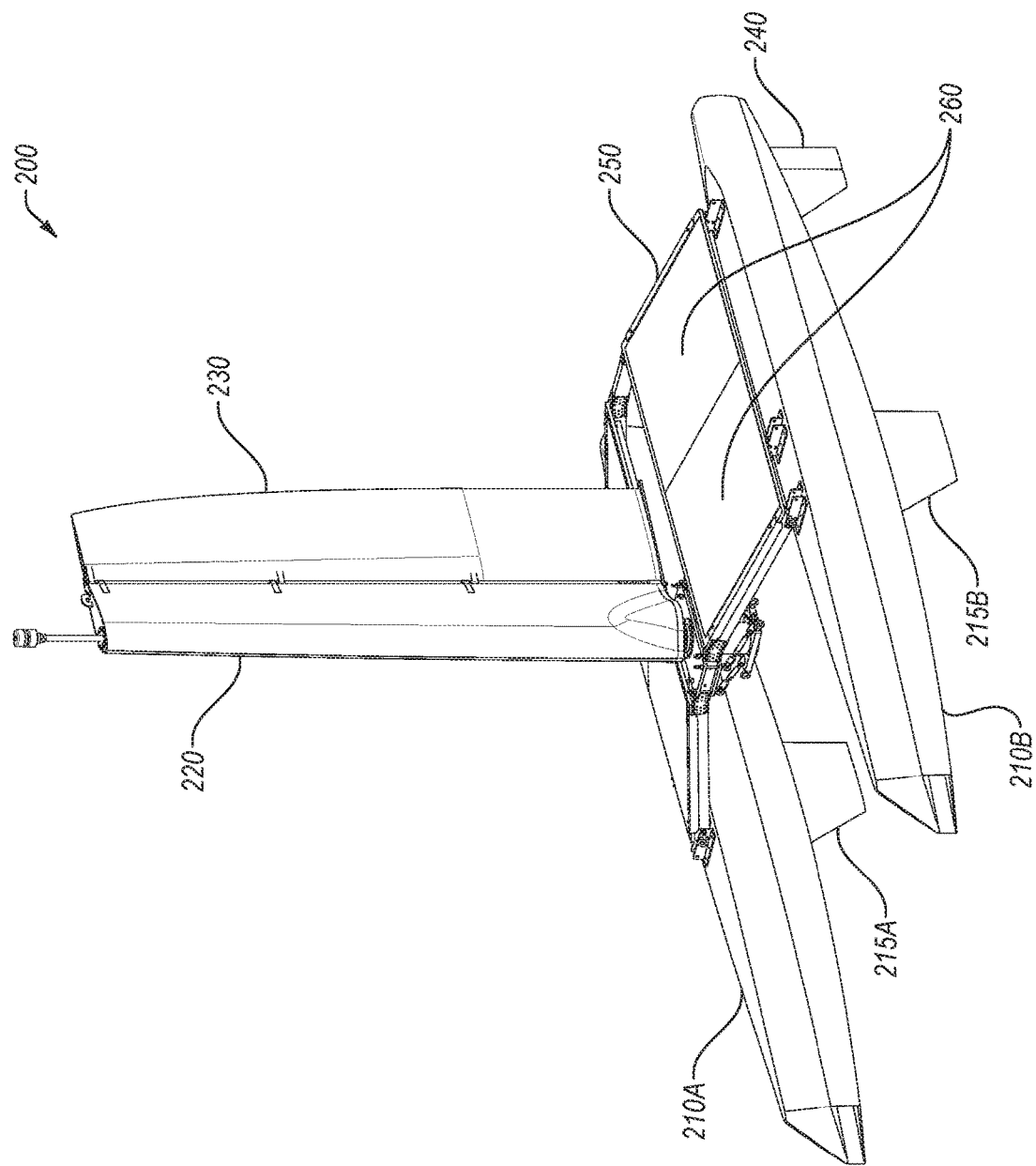
FIG. 2 illustrates an example autonomous sailing vessel that may be implemented in the system of FIG. 1.

FIG. 2 illustrates an example autonomous sailing vessel 200 arranged in accordance with at least one embodiment described herein. The autonomous sailing vessel 200 may include or correspond to any or each of the autonomous sailing vessels 110 of FIG. 1. Various example aspects of autonomous sailing vessels that may be included in the autonomous sailing vessel 200 of FIG. 2 and/or other autonomous sailing vessels described herein are described in U.S. Pat. No. 8,973,511 and U.S. Patent Publication No. 2018/0217588, each of which is incorporated herein by reference in its entirety.

Some specific pertinent aspects of the autonomous sailing vessel 200 are described as follows. Referring to FIG. 2, the autonomous sailing vessel 200 may include one or more hulls 210A, 210B (generally hull or hulls 210), a mast 220, a sail 230, and a rudder 240. The autonomous sailing vessel 200 may further include a connector structure 250, one or more lights, one or more solar panels 260 and/or other power generator equipment, one or more sensors, and/or one or more other components. Other configurations than illustrated are contemplated and a person of skill in the art would appreciate modifications without departing from the scope of the invention.

As illustrated in FIG. 2, the autonomous sailing vessel 200 includes two hulls 210 spaced apart from and parallel to each other. Alternatively, the autonomous sailing vessel 200 may include a single hull 210, or three or more hulls 210. The autonomous sailing vessel 200 may include a barge, a monohull, a catamaran, a trimaran (triple hull catamaran), or other suitable sailing vessel.

The mast 220 may be mechanically coupled, directly or indirectly, to the hull 210A and/or 210B. A first component may be considered to be indirectly coupled to a second component when the first component is coupled to the second component through one or more intervening components. In the illustrated embodiment of FIG. 2, the mast 220 is mechanically coupled indirectly to both of the hulls 210 through the connector structure 250, which may include a truss, a platform, and/or other elements or components.

The sail 230 may be mechanically coupled, directly or indirectly, to the mast 220. In the illustrated embodiment of FIG. 2, the mast 220 is mechanically coupled directly to the mast 220. The sail 230 in FIG. 2 includes a wingsail rotatably coupled to the mast 220.

The rudder 240 may be mechanically coupled, directly or indirectly, to the hull 210B. Although not visible in FIG. 2, the hull 210A may alternatively or additionally have a rudder mechanically coupled thereto. While the rudder 240 in FIG. 2 is illustrated as being coupled directly to the hull 210B, in other embodiments the rudder 240 may be coupled indirectly to one or both of the hulls 210, e.g., through the connector structure 250. As will be described in more detail below, the rudder 240 (or multiple rudders if included in the autonomous sailing vessel 200) may be actively controllable, e.g., by a processor or other computer device of the autonomous sailing vessel 200, without actively controlling the sail 230 to regulate a heading and/or course of the autonomous sailing vessel 200.

As illustrated in FIG. 2, each of the hulls 210 includes a keel 215A, 215B (generally keel or keels 215). Alternatively, a single one of the hulls 210 may include a keel and/or one or more keels may be supported by and mechanically coupled to the connector structure 250 rather than and/or in addition to the hulls 210.

The solar panels 260 or other power generator equipment may be mechanically coupled to one or more of the hulls 210 and/or the connector structure 250. As illustrated, the solar panels 260 are supported on the connector structure 250.

In the illustrated embodiment of FIG. 2, the sail 230 is mechanically coupled directly to the mast 220. The sail 230 in FIG. 2 includes a wingsail rotatably coupled to the mast 220.

As described in more detail below, the autonomous sailing vessel 200 may further include one or more of an anticapsize mechanism, a lidar system, and/or a marine mammal detection system.

The autonomous sailing vessel 200 may be relatively small and light, so as not to pose a threat to another vessel in the event of a collision. For example, the autonomous sailing vessel 200 may have a length of about 8 feet, a beam of about 6 feet, and a weight of about 200 pounds, and may be equipped with red, green, and white running lights (not illustrated) for optional use at night, particularly in high traffic areas. As another example, in terms of size, the autonomous sailing vessel 200 may have a length of about 12 feet, a beam of about 6 feet, and a weight of about 400 pounds. As yet another example, in terms of size, the autonomous sailing vessel 200 may have a length of about 16 feet, a beam of about 10 feet, and a weight of about 700 pounds.

In some embodiments, the autonomous sailing vessel may include an auxiliary propulsion device (not shown in FIG. 2). The autonomous sailing vessel 200 may further include a control unit having communication and other monitoring equipment at the top of the mast 220, and/or water-tight compartments, e.g., within one or more of the hulls 210, within which additional equipment may be configured. The solar panels 260 may provide the energy required to power the auxiliary propulsion device as well as the on-board communication, control, and monitoring systems. Optionally, the propulsion device, if included, may be configured to generate electricity while the autonomous sailing vessel 200 travels under sail.

The autonomous sailing vessel 200 may include multiple water-tight compartments. In a typical configuration, one of the compartments includes the navigation and communication control systems and battery storage, and the remaining compartments are available for mission-specific payload systems.

One or both of the keels 215 may be configured to contain monitoring devices (not illustrated) for surface and underwater monitoring, such as, telephony equipment or acoustic modems, among other things. The hulls 210 and connector structure 250 may also be configured to contain other monitoring devices, depending upon the particular mission.

The control unit of the autonomous sailing vessel 200 may control overall operations of the autonomous sailing vessel 200. More particularly, the control unit may control a heading and/or course of the autonomous sailing vessel 200 and sensor data that may be collected using one or more sensors that may be included in the autonomous sailing vessel 200. More generally, the control unit may control any and all operations of the autonomous sailing vessel 200 that may be remotely executed, commanded and/or controlled.

Although not shown in FIG. 2, a controller or processor, a RF transceiver, a GPS receiver, or any other similar and/or suitable position information receiver, a battery unit, a memory, and at least one of the one or more sensors may be included in the control unit. The RF transceiver may be used for transmitting and/or receiving any type of RF signal used for wireless communication. The controller may execute processing, computations, and communication functions and operations for the controlling of the overall operations of the autonomous sailing vessel 200. The controller may read data from and write data to the memory which may be employed to store data used for the control of the operations of the autonomous sailing vessel 200, data generated by the one or more sensors, data transmitted and/or received by the RF transceiver, and any other similar and/or suitable type of data.

The control unit may be placed anywhere on the autonomous sailing vessel 200 so long that it may be operatively connected to parts of the autonomous sailing vessel 200 which the control unit controls or communicates with. For example, the rudder 240 may be connected to the controller included in the control unit using a wired and/or a wireless connection in order to receive a rudder control signal. Accordingly, the controller may control a position of the rudder 240 using the rudder control signal.

Optionally, the autonomous sailing vessel 200 may be provided with self-righting capabilities as described in the '511 patent.

Figure 3:
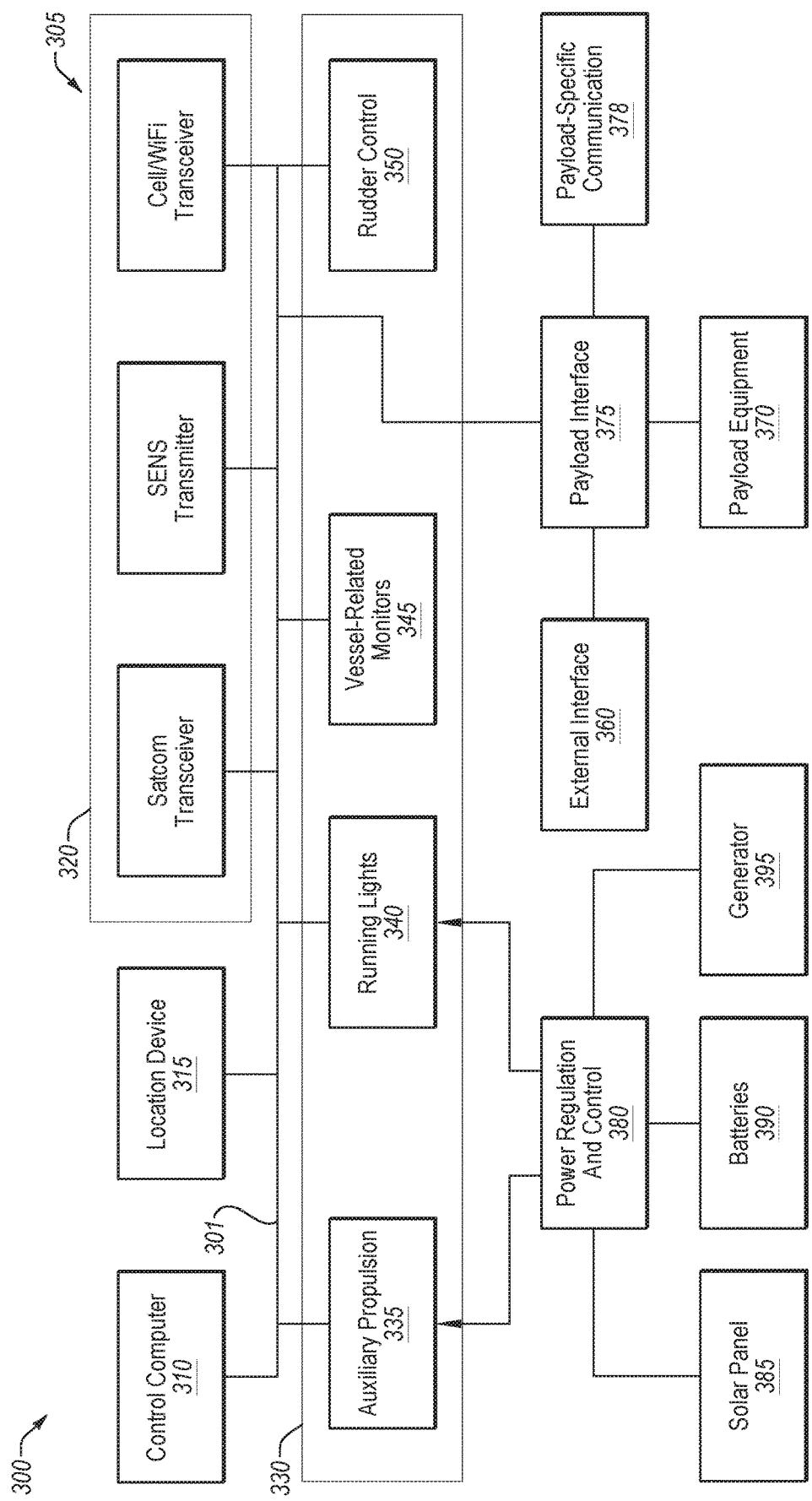
FIG. 3 is a block diagram of an example autonomous sailing vessel that includes a control unit.

FIG. 3 is a block diagram of an example autonomous sailing vessel 300 that includes a control unit 305, arranged in accordance with at least one embodiment described herein. The autonomous sailing vessel 300 may include or correspond to any of the other autonomous sailing vessels described herein. The control unit 305 may include or correspond to the control unit described in connection with FIG. 2. The control unit 305 may include one or more of a control computer 310, a location device 315, a communication interface 320, and/or other devices or systems.

The control computer 310 may coordinate operation of the equipment on the corresponding autonomous sailing vessel. The degree of interaction and control of the payload mission specific monitoring exercised by the control computer 310 may vary, depending upon the particular mission and/or the particular type of monitoring.

Although illustrated as a single block, the control computer 310 may include multiple processing systems, including, for example, redundant systems for fail-safe operation and/or embedded systems customized for particular tasks, such as navigation (not shown). The operation of the control computer 310 may best be understood in the context of the equipment on board with which the control computer 310 interacts, as follows. The functions of the control computer 310 may be provided as programming for a general purpose computer having memory and a processor. In such a case, the control computer 310 may receive from time to time replacement instructions to update and/or modify the system programming of the control computer 310. For example, the replacement instructions may be received from a control station, such as the control station 130 of FIG. 1.

Alternatively or additionally, the functions of the control computer 310 may be provided as one or more application-specific integrated circuits (ASICs) especially for embedded processes of standard instrumentation such as communication and GPS as well as navigation systems.

The location device 315 may include a GPS receiver or other location device. When implemented as a GPS receiver, the location device 315 may receive messages from multiple satellites, from which the latitude and longitude of the location device 315 (and thus the location of the autonomous sailing vessel 300) is determined. Other means may be employed for providing location such as programming and instrumentation to perform alternative approaches to be used in GPS denied environments, such as dead reckoning or celestial navigation which the control computer 310 may choose under varying circumstances. Depending upon the capabilities of the location device 315, other information, such as the speed and direction of travel, may also be provided; or, another element, such as the control computer 310, may determine the speed and direction of travel from the reported locations over time. Other means and methods for the location device 315 may be implemented. The location information may be provided on a communication bus 301 for use by any of the devices on the communication bus 301. The control computer 310 may use the current location of the autonomous sailing vessel 300 to determine a route to a target area, may use the speed and direction of travel information to trim the rudder (not shown in FIG. 3) to compensate for drift, and so on. The location information may also be included in one or more monitoring messages that may be transmitted from the autonomous sailing vessel 300.

The communication interface 320 may include a satellite communication (Satcom) transceiver, a Sensor Enabled Notification System (SENS) transmitter, a cell/WiFi transceiver, and/or other suitable communication devices. The communication interface 320 may receive messages for the autonomous sailing vessel 300 and/or may transmit messages from the autonomous sailing vessel 300 to, e.g., a control station or monitor station, such as the control station 130 or the monitor station 140 of FIG. 1.

FIG. 3 also illustrates other equipment 330 of the autonomous sailing vessel 300. The equipment 330 may include auxiliary propulsion equipment 335, running lights 340, vessel-related monitors 345, and/or rudder control 350.

The auxiliary propulsion equipment 335 may provide directionally controlled propulsion on demand, e.g., when the sail is unable to achieve sufficient progress toward the target area, unable to maintain location in an assigned area, or when "weather-independent" control is required, such as in high traffic areas.

The running lights 340 may be operated when the autonomous sailing vessel is used in high-traffic areas, at night, and/or at any other time when required for regulatory compliance. The running lights 340 may include a set of red, green, and/or white running lights and/or other suitable running lights.

The vessel-related monitors 345 may be provided to determine a status of the autonomous sailing vessel and its environment. The vessel-related monitors 345 may include, for example, a wind direction and speed monitor, a speed-thru-water transducer, a water velocity sensor, voltage and current monitors, inertial monitors, a sail orientation monitor, a rudder orientation monitor, heeling-angle monitor, compass heading monitor, and/or other suitable monitors or sensors.

The rudder control system 350 may actively control the orientation of the rudder of the autonomous sailing vessel 300 to regulate heading and/or course of the autonomous sailing vessel 300 and without actively controlling the sail. The rudder control system 350 may include a rudder actuator mechanically coupled to the rudder and communicatively coupled to a processor or other control computer 310 and/or the control unit 305.

An external interface 360 may be provided in the autonomous sailing vessel 300 to configure and test equipment during development and before and after each deployment.

As noted above, the autonomous sailing vessel 300 may be used to convey mission-specific payload equipment 370 to a target area. The payload equipment 370 may include a collection of monitoring devices, such as cameras, transducers, and/or other monitoring devices. Alternatively or additionally, the payload equipment 370 may include a loudspeaker system to make announcements under certain situations such as when a vessel is detected near a restricted area and/or a microphone system to provide for two-way vocal communications.

Other sensors that may be included in the mission-specific payload equipment 370 may include video and infrared cameras, scanners, acoustic sensors and hydrophones, conductivity sensors, oxygen and other gas sensors, barometers, and opto-fluidic water quality sensors, hydrocarbon detectors, Geiger counters, salinity and pH sensors, pressure sensors, and/or other sensors or monitoring devices.

The autonomous sailing vessel 300 may further include a payload interface 375 to integrate the payload equipment 370 into the control system, e.g., the control unit 305, of the autonomous sailing vessel 300. The payload interface 375 may be used to communicate any monitoring commands received from the communication interface 320, to communicate monitored information to the control computer 310, or directly to the communication interface 320. The payload may have its own payload-specific communication interface 378 that may be independent of the control unit's 300 communication interface 320.

The autonomous sailing vessel 300 may further include a power regulation and control system 380 to provide power to the various equipment on the autonomous sailing vessel 300. The power regulation and control system 380 may receive energy from solar panels 385 (which may include or correspond to the solar panels 260 of FIG. 2) that are mounted on the autonomous sailing vessel 300. A battery system that may include one or more batteries 390 may store some of this energy to provide power when the solar panels 385 are not generating electricity and/or to supply bursts of power in excess of that available from the solar panel 385 and/or a generator 395. Optionally, the auxiliary propulsion equipment 335 may include the generator 395 that generates electricity when the sail propels the autonomous sailing vessel 300. Other kinetic power harvesting techniques may be employed, such as a Witt generator, which may be implemented in and/or as the generator 395.

A challenge with autonomous sailing vessels is that they may need to maintain a target heading in the face of various disturbances. For example, changing wind speed, waves, or currents may drive the autonomous sailing vessel off the target heading. Some heading control systems adjust both the rudder and sail based on inputs from an electronic steering system. This is consistent with standard manned sailing practice in which both sail(s) and rudder are controlled to maintain and/or regulate heading.

Some embodiments described herein control heading and/or course through active control of the rudder only and without active control of the sail. Heading may refer to a direction the autonomous sailing vessel is pointed, while course may refer to an actual track or course of the autonomous sailing vessel. Heading may be different than course owing to sideslip of the autonomous sailing vessel as it moves through water. An angle between the course and the heading is the angle of attack of fixed hydrodynamic surfaces. Lift forces that react against wind forces may be roughly proportional to the angle of attack.

Active control of the rudder or other component may refer to controlling and making adjustments to the position and/or orientation of the rudder relative to the hull or other component of the autonomous sailing vessel responsive to one or more inputs. Active control of the rudder without active control of the sail may simplify control of the autonomous sailing vessel and/or simplify the hardware of the autonomous sailing vessel compared to vessels that implement heading control through active control of both the rudder and sail.

When heading control is available, it is relatively straightforward to define the headings and target locations needed to make progress to a specific destination or to make progress along an ordered set of specific destinations. Defining headings and target locations to make progress to a specific destination or to make progress along an ordered set of specific destinations is not new technology; it is as old as sailing itself. Autonomous sailing vessels as described herein may also have an executive-level function and decision-making ability on top of the heading control and/or course control to make specific waypoints.

Embodiments described herein may implement a closed loop feedback control system to minimize heading error, e.g., a deviation between an actual heading and the target heading, as the autonomous sailing vessel makes its way along a specified course. The closed loop feedback system may include a proportional/integral/derivative (PID) controller to determine a rudder position that reduces the heading error to some tolerable level. The implementation of the closed loop feedback system may be analog, digital, or some combination of the two.

The closed loop feedback system may be implemented by a control unit, such as the control unit 305 of FIG. 3, that is communicatively coupled to a water velocity sensor and a rudder actuator such as may be included in an autonomous sailing vessel (e.g., the autonomous sailing vessel 110, 200, 300) that further includes a rudder (e.g., the rudder 240). The control unit may be configured to operate the rudder actuator to actively control the rudder to regulate the heading and/or course responsive to input from the water velocity sensor and without actively controlling a sail of the autonomous sailing vessel.

The control unit may execute one or more control functions to regulate the heading. For example, the one or more control functions may include at least one of: a proportional control function that has a proportional gain $K_P$; an integral control function that has an integral gain $K_I$; and a derivative control function that has a derivative gain $K_D$. As will be described with respect to FIGS. 4A and 4B, in this and other embodiments, the control unit may include a proportional-integral-derivative (PID) controller that executes the proportional control function, the integral control function, and the derivative control function; a proportional-integral (PI) controller that executes the proportional control function and the integral control function; or a proportional (P) controller that executes the proportional control function, where an output of the controller is proportional to a deviation of the heading from a target heading, to an integral of the deviation, or to a time rate of change of the deviation.

In some embodiments, at least one of the proportional gain $K_P$, the integral gain $K_I$, and the derivative gain $K_D$ may vary based on a speed and/or velocity of the autonomous sailing vessel relative to the water, the speed and/or velocity detected by the water velocity sensor. For example, at least one of the proportional gain $K_P$, the integral gain $K_I$, and the derivative gain $K_D$ may vary proportionally to the speed and/or velocity, may vary with a square of the speed and/or velocity, or may vary with a power of the speed and/or velocity where the power of the speed and/or velocity is in a range between 0.8 and 2.5. Alternatively or additionally, a sign of at least one of the proportional gain $K_P$, the integral gain $K_I$, and the derivative gain $K_D$ may depend on the sign of the forward water speed of the autonomous sailing vessel.

In some cases the autonomous sailing vessel may further include a wind speed sensor configured to determine wind speed. In these and other embodiments, at least one of the proportional gain $K_P$, the integral gain $K_I$, and the derivative gain $K_D$ may vary continuously with wind speed. Alternatively or additionally, at least one of the proportional gain $K_P$, the integral gain $K_I$, and the derivative gain $K_D$ may vary in some other manner, such as in a stepwise manner as will be described in more detail below.

In some embodiments, a course of the autonomous sailing vessel may be regulated by actively controlling the rudder without actively controlling the sail. The course may be regulated using a closed loop feedback system, e.g., included in and/or implemented by the control unit, similar to regulation of the heading. Alternatively or additionally, course and heading may be regulated using a nested closed loop feedback system. In this and other embodiments, the autonomous sailing vessel may further include a position sensor to determine a position of the autonomous sailing vessel. The control unit may be communicatively coupled to the water velocity sensor, the rudder actuator, and the position sensor, and the control unit may be configured to operate the rudder actuator to control the rudder to regulate the heading responsive to input from the water velocity sensor and to regulate the course responsive to input from the position sensor. In these and other embodiments, the control unit may execute a heading control loop to regulate the heading and a course control loop to regulate the course, where the course control loop may run at a slower frequency than the heading control loop.

Figure 4A:
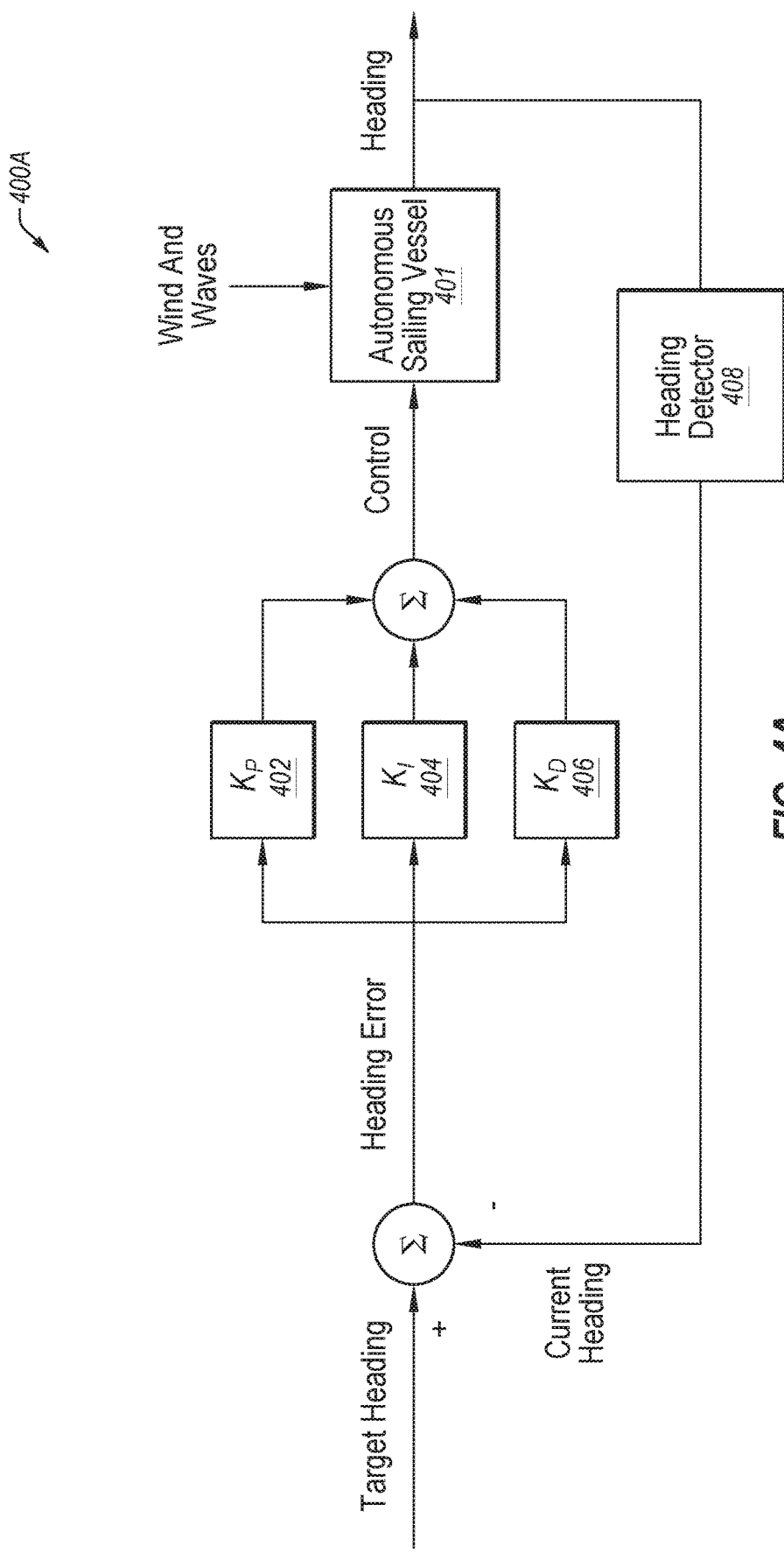
FIG. 4A illustrates an example heading controller that may be implemented in an autonomous sailing vessel.
Figure 4B:
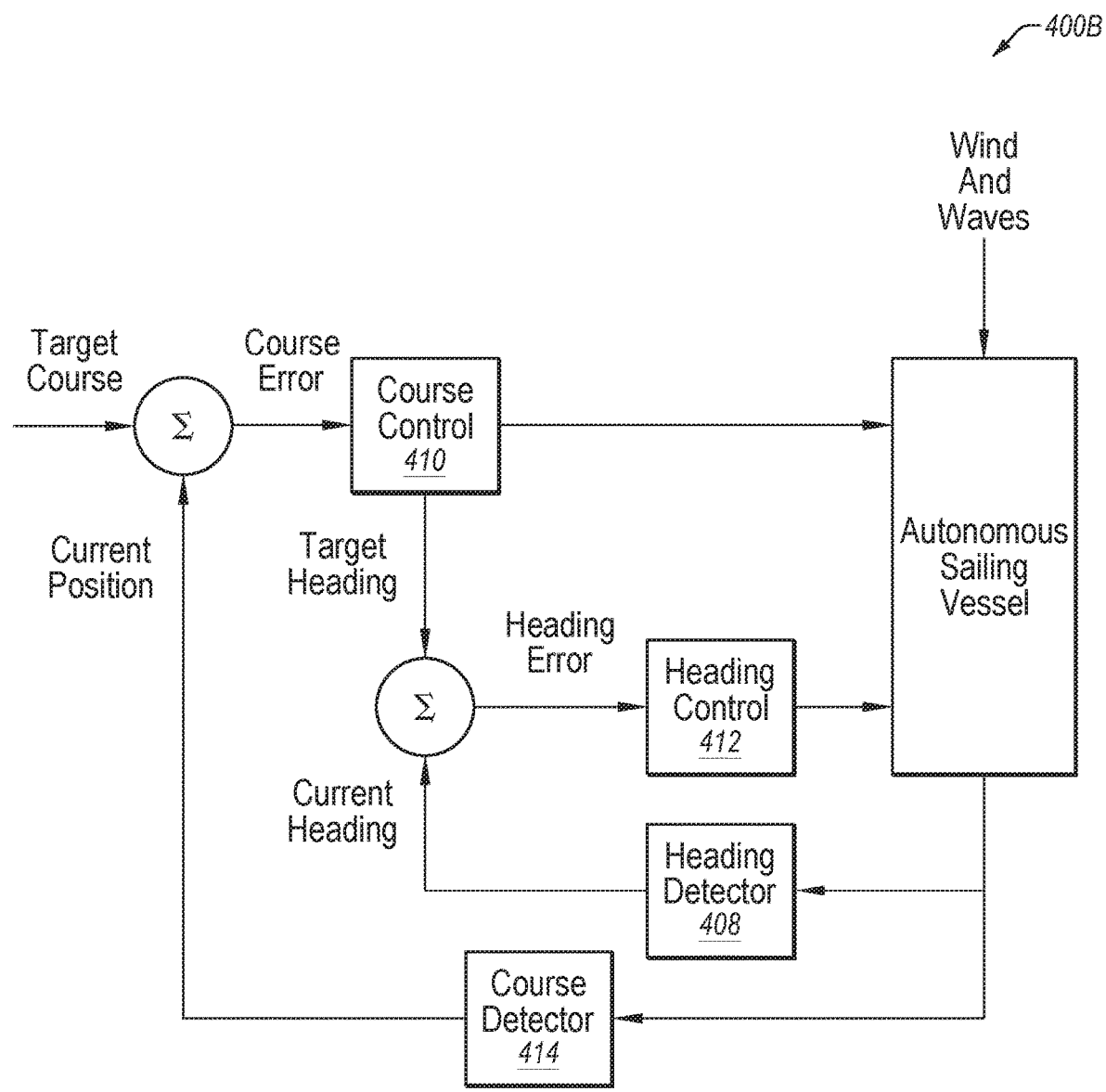
FIG. 4B illustrates an example nested course and heading controller that may be implemented in the autonomous sailing vessel of FIG. 4A.

The control unit may be configured to regulate the course based on a deviation of a current position of the autonomous sailing vessel from a point on a target course of the autonomous sailing vessel. The point on the target course may include a normal line point of intersection of the target course with a normal line that passes through the current position. Alternatively, the point on the target course may include a fixed distance point of intersection of the target course with a line segment that begins at the current position, terminates at the fixed distance point of intersection, and has a length equal to a fixed length. FIGS. 4A and 4B illustrate example closed loop feedback systems that may be implemented in autonomous sailing vessels as described herein consistent with the foregoing discussion.

In more detail, FIG. 4A illustrates an example heading controller 400A that may be implemented in an autonomous sailing vessel 401, arranged in accordance with at least one embodiment described herein. The heading controller 400A may be included in and/or executed by, e.g., the control unit 305 of FIG. 3. The heading controller 400A is specifically a PID heading controller in this example. The heading controller 400A includes a proportional control function 402 that has a proportional gain $K_P$, an integral control function 404 that has an integral gain $K_I$, and a derivative control function 406 that has a derivative gain $K_D$. In other embodiments, the heading controller 400A may include a single control function, two control functions, or more control functions. For example, the heading controller 400A may be of the (PI) type with the proportional control function 402 and the integral control function 404 and no derivative control function 406. Alternatively, the heading controller 400A may be of the P type with the proportional control function 402 and no integral control function 404 or derivative control function 406 where the corrective action taken is proportional to the deviation, the integral of the deviation, or the time rate of change (e.g., derivative) of the deviation.

In general, the heading controller 400A may calculate a "Heading Error" or deviation was a difference between a desired setpoint "Target heading" and a measured value "Current Heading" detected by a heading detector 408. The heading detector 408 may include one or more of the sensors or monitors described elsewhere herein and/or may include a water velocity sensor.

Each of the control functions 402, 404, 406 calculates a correction having, respectively, proportional, integral, or derivative influence based on the Heading Error and the corrections are summed and applied as a control to the autonomous sailing vessel 401. The actual heading of the autonomous sailing vessel 401, in turn, is affected by, e.g., wind and waves that cause the actual heading to deviate from the target heading such that the process may be repeated over time to keep the actual heading within some tolerable deviation of the target heading. The process may repeat continually, randomly, and/or periodically at a heading control frequency.

Integral control, e.g., the integral control function 404, may be used to manage uniform following errors while proportional and derivative control, e.g., the proportional control function 402 and the derivative control function 406, may be used to quickly arrive at the target within a tolerable error and with tolerable dynamics usually manifest as oscillations.

State of the art for track line following with powered vehicles is known. Control points and means for autonomous sailing vessels are quite different from powered vessels, and one skilled in the art of designing powered vessel control systems may not appreciate the unique challenges of controlling sailing vessels.

As already described above, heading is the direction a vessel is pointed while course may be slightly different due to sideslip of the vessel as it moves through water. Further, the angle between course and heading is the angle of attack of fixed hydrodynamic surfaces and the lift forces that react against wind forces may be roughly proportional to the angle of attack. Some embodiments herein may close the loop around heading error because as the autonomous sailing vessel 401 moves and the target heading is updated, the control loop may automatically compensate for the sideslip and local water currents.

In general, when a sailing vessel is sailing forward on a fixed heading it is likely the rudder position will not be in a "neutral" position. Should the sailing vessel encounter winds or waves that stop forward progress and cause backward progress, the rudder position will no longer be in a proper position to maintain the desired heading. In fact, the rudder should be set in the opposite direction during backward progress to maintain the desired heading. With backward motion and unchanged rudder position, the sailing vessel becomes unstable.

To restore stability, the control system, or heading controller 400A in this example, may have knowledge of whether the sailing vessel is traveling forward or backward relative to the water. Stable autonomous vessel sailing may have a water velocity sensor and adjust control parameters depending on at least the sign of the forward water speed. The control parameters may include at least one of the proportional gain $K_P$, the integral gain $K_I$, and the derivative gain $K_D$ of the control functions 402, 404, 406.

To maintain backwards compatibility with legacy water speed sensors, some modern water speed sensors do not indicate the sign of the longitudinal speed. A feature of the control system described herein is that it may rely on a water velocity sensor that indicates sign as opposed to solely magnitude.

Some embodiments described herein may also incorporate a transverse water velocity sensor. High transverse water velocity implies high sideslip. A human sailor may compensate for high sideslip by changing the rudder position. An autonomous sailing vessel such as the autonomous sailing vessel 401 of FIG. 4 with the heading controller 400A implemented as a PID control loop that minimizes heading error will not necessarily need to react to transverse water velocity because the integrating component, or integral control function 404, of the control loop will eventually compensate for the sideslip. However, by directly incorporating the transverse water velocity as an input in the control loop and increasing rudder position with more side slip, the autonomous sailing vessel 401 will more quickly compensate for the sideslip. Incorporating the transverse water velocity as an input may be implemented as an alternative or in addition to increasing control loop gains (e.g., $K_P$, $K_I$, and $K_D$) which may degrade stability when implemented without considering transverse water velocity.

While some embodiments may include a first water velocity sensor aligned to detect longitudinal water velocity and a second water velocity sensor aligned to detect transverse water velocity, e.g., to quickly compensate for high sideslip, more generally any combination of water velocity sensors that detect longitudinal and transverse components of relative water velocity may be implemented. Accordingly, any pair of water velocity sensors that are not co-aligned and from which longitudinal and transverse components of the relative water velocity may be determined, e.g., by vector addition or subtraction, may be included in the autonomous sailing vessel 401 and may be referred to as a longitudinal water velocity sensor and a transverse water velocity sensor whether or not one of the water velocity sensors is aligned specifically to the longitudinal water velocity and/or the other water velocity sensor is aligned specifically to the transverse water velocity.

In some embodiments, the heading controller 400A may evolve with wind speed. In particular, the control loop gains ($K_P$, $K_I$, and $K_D$) and/or other parameters of the heading controller 400A may be adjusted based on the wind speed relative to the autonomous sailing vessel 401. Thus, the autonomous sailing vessel 401 may include one or more wind speed sensors. The control loop gains may vary continuously with wind speed. Alternatively, the control loop gains may vary in a stepwise manner with wind speed. For example, for any wind speed in a range from 0 to x (arbitrary units, x>0), the control loop gains may each have a corresponding value; for any wind speed in a range from x to y (arbitrary units, y>x), the control loop gains may each have a different corresponding value; and for any wind speed in a range greater than y (arbitrary units), the control loop gains may each have yet another different corresponding value. Thus, some embodiments may detect the wind speed and adjust a value of one or more of the control loop gains based on the detected wind speed. The adjustments may be continuous, stepwise, or in some other manner.

In some embodiments, the heading controller 400A may evolve with relative velocity of the autonomous sailing vessel 401 to water. In particular, the control loop gains ($K_P$, $K_I$, and $K_D$) and/or other parameters of the heading controller 400A may be adjusted based on the relative velocity of the autonomous sailing vessel 401 to water. The relative velocity may be detected by one or more water velocity sensors as already discussed. The control loop gains may vary continuously or in some other manner with water velocity. For example, one or more of the control loop gains may vary proportionally to the relative velocity, may vary with the square of the relative velocity, and/or may vary with a power of the relative velocity where the power is in a range between 0.8 and 2.5.

Alternatively or additionally, the sign of the control loop gains may depend on the sign (positive for forward motion, negative for reverse motion) of the relative water velocity to maintain sailing system stability. For a given angle of attack of the rudder relative to water motion, the forces on the rudder may be different (beyond a sign change) for forward and reverse relative motion. The control loop gains may take into account this difference and change in value beyond a simple sign change.

In addition to monitoring and controlling heading, it may be desirable to control how close the autonomous sailing vessel is to a target course. For example, if the objective is to sail on a straight-line course from the current position to a target destination, then only controlling heading may not be adequate. Once the straight-line target course has been established and defined, then the actual position of the autonomous sailing vessel may deviate from the target course. Deviations from the target course may result from wind force disturbance inputs, wave force disturbance inputs, or other uncontrolled disturbance inputs to the autonomous sailing vessel.

Accordingly, embodiments described herein may implement a cascaded pair of control loops. In particular, to the heading control loop described with respect to FIG. 4A, a second control loop for course control, e.g., a course control loop, that runs at a slower rate than the heading control loop may be added. The course control loop (the outer control loop, the outer primary control loop, or the outer nested control loop) may attempt to minimize the distance of the autonomous sailing platform from the target course. The heading control loop may be implemented as the inner secondary or nested control loop. Distance to be minimized may be measured in several ways for the course control loop. For example, the course control loop may attempt to minimize the distance from the autonomous sailing vessel's position to the target course along a line perpendicular to the target course. Alternately, the control loop may attempt to minimize the distance to a point on the target course a fixed distance in the direction of the target destination.

Consistent with the foregoing, FIG. 4B illustrates an example nested course and heading controller 400B ("course/heading controller 400B") that may be implemented in the autonomous sailing vessel 401, arranged in accordance with at least one embodiment described herein. The course/heading controller 400B may be included in and/or executed by, e.g., the control unit 305 of FIG. 3. The course/heading controller 400B may include both course control 410 and heading control 412.

The heading control 412 may include one or more of the control functions 402, 404, and/or 406 of FIG. 4A and may function in the same or similar manner as the heading controller 400A of FIG. 4A.

The course control 410 may analogously include one or more of a proportional control function, an integral control function, and a derivative control function and may function in the same or similar manner as the heading controller 400A of FIG. 4A except that, e.g., the desired setpoint is "Target Course, the calculated error or deviation is "Course Error", the measured value is "Current Position", and a course detector 414 such as a location detector is used to detect the current position. Each of the one or more control functions of the course control 410 may calculate a correction having, respectively, proportional, integral, or derivative influence based on the Course Error and the corrections may be summed and applied as a control to the autonomous sailing vessel 401. The course control 410 may run at a slower frequency than the heading control 412.

Some embodiments of the autonomous sailing vessels described herein may alternatively or additionally include a lidar system that may generally make remote non-contact wind speed measurements.

To measure wind speeds from any direction, rotating laser beams may be used to sweep out a cone on which measurements are made, or multiple lasers may be used which are generally pointing along the same cone. The "sweeping" may be done by rotating mirrors to redirect the laser beam, or by rotating the actual laser. The sweeping system has the advantage that measurements along the laser beam may be made at any position through the sweep of the cone. Multiple (but fixed pointing direction) laser beam systems have the advantage of no moving parts.

It may be useful to measure wind speed to characterize potential sites for renewable wind energy generation. To characterize a potential site, wind speeds may be measured at altitudes useful to future wind turbine operators. The winds can come from any direction and the wind turbine must be appropriately pointed. Wind speeds from all directions may be useful to characterize a site's power producing potential. To measure wind speeds from all directions, a single laser sweeping out a cone defined by a vertical axis may be required for a sailing vessel-mounted lidar system to ensure wind speeds from all directions are measured with equal fidelity.

For offshore wind site assays, it may be desirable to collect wind speed data over long-time spans, preferably up to years, to properly assess the site power production opportunity. Measurements of both the speed and direction of the wind are essential. Lidar-based wind measurements can be made from manned surface vessels, from tethered buoys, or from autonomous surface vessels. Most important for power production assessments is the wind speed in the plane of the water surface. This means the axis of the lidar system (whether moving or stationary lasers) is generally vertical. The finite (fixed and known) measurement cone angle may allow conversion of the measured wind speed along the laser measurement signal direction into components parallel to the water surface.

Long-duration mission autonomous surface vessels may generally be sail-powered because onboard fuel supply may be too limited to support a long-duration powered vessel. Vessels with a single sail may be problematic for implementing a lidar system since the sail's lifting surface may be near the center of the vessel, which is where the payload weight of the lidar system should logically be placed as well. The upward facing laser will inevitably be blocked from sensing parts of the wind field by the sail, which is likely to be opaque to useful laser wavelengths. This fundamental application constraint suggests it may be difficult or impossible to implement a lidar system on small autonomous sailing vessels for wind speed characterization, particularly where the autonomous sailing vessels are single-sailed vessels.

Embodiments described herein may overcome at least the foregoing difficulty with implementing a lidar system on an autonomous sailing vessel.

First, according to at least one embodiment, the autonomous sailing vessel may include two masts and two sails where the lidar system is positioned generally amidship between the two masts and sails. The sails may be spaced far enough apart that the measurement cone of the lidar system is not obstructed by the sails.

Alternatively, according to at least one embodiment, the autonomous sailing vessel may include a single mast and sail positioned generally near the middle (fore-to-aft) of the autonomous sailing vessel. Forces on the autonomous sailing vessel by the sail may be balanced by forces on the autonomous sailing vessel by underwater elements. These forces generally must have resultants near the center of the autonomous sailing vessel. The lidar system and its associated power supply may also have its center of gravity near the center of the autonomous sailing vessel. One configuration to achieve the desired weight distribution positions the lidar system just fore of the single sail and mast and positions electrical energy storage and electrical power generation systems to the aft of the platform, or vice versa.

Figure 5A:
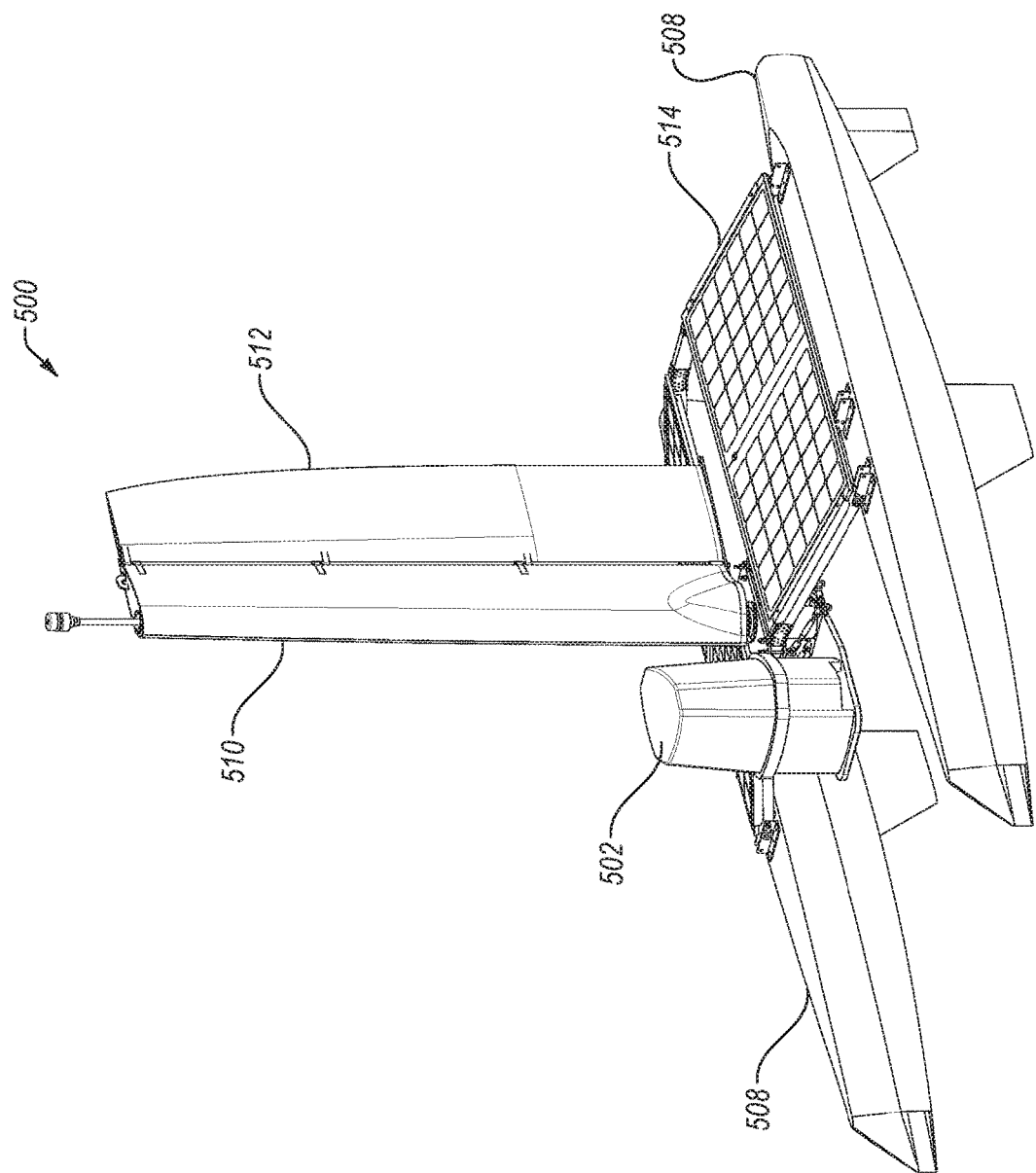
FIG. 5A illustrates an example autonomous sailing vessel that includes a lidar system.
Figure 5B:
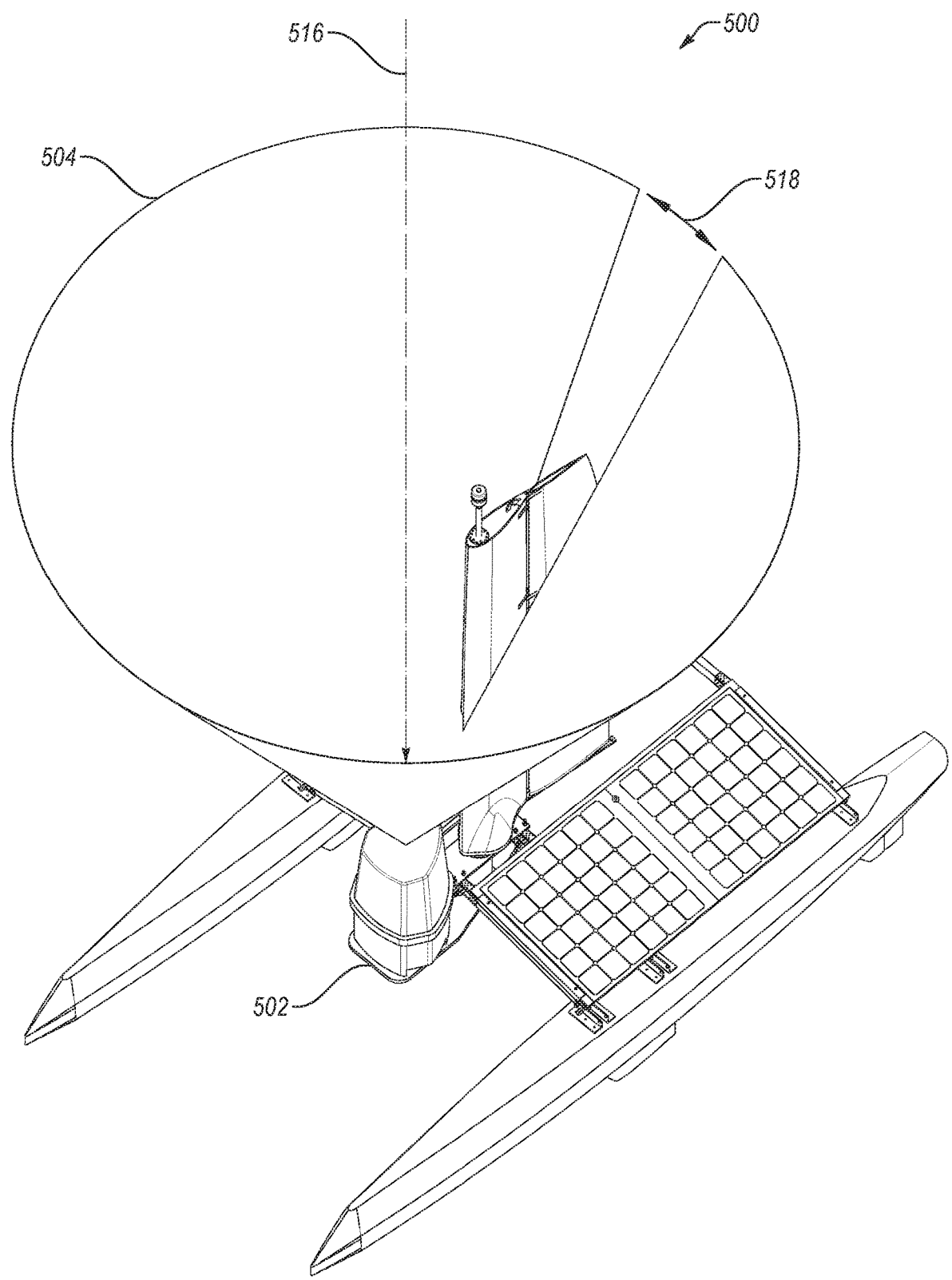
FIG. 5B illustrates the autonomous sailing vessel of FIG. 5A with the lidar system having a measurement cone oriented vertically.
Figure 5C:
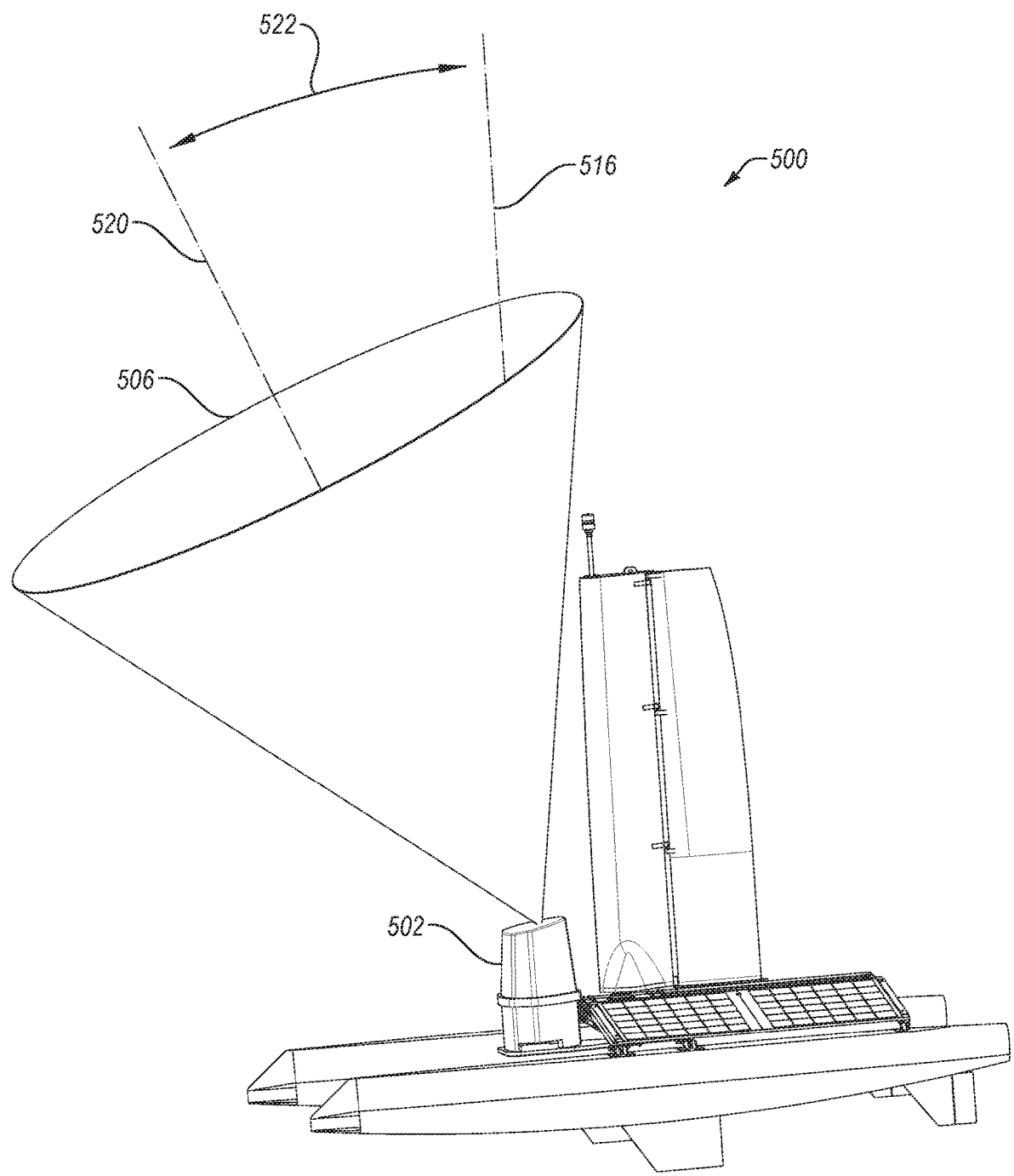
FIG. 5C illustrates the autonomous sailing vessel of FIG. 5A with the lidar system having a measurement cone tilted from vertical.

For example, FIG. 5A illustrates an example autonomous sailing vessel 500 that includes a lidar system 502, arranged in accordance with at least one embodiment described herein. FIG. 5B illustrates the autonomous sailing vessel 500 with the lidar system 502 having a measurement cone 504 oriented vertically, arranged in accordance with at least one embodiment described herein. FIG. 5C illustrates the autonomous sailing vessel 500 with the lidar system 502 having a measurement cone 506 tilted from vertical, arranged in accordance with at least one embodiment described herein.

The autonomous sailing vessel 500 may include or correspond to any the autonomous sailing vessels described elsewhere herein. As illustrated, the autonomous sailing vessel 500 further includes two hulls 508, a mast 510, a sail 512, a connector structure 514, and/or one or more other elements as described with respect to, e.g., FIGS. 1-4B. The lidar system 502 is positioned fore of the mast 510 and sail 512 and mechanically coupled indirectly to each of the hulls 508 through the connector structure 514, while electrical energy storage (e.g., batteries, not shown) and/or electrical power generation (e.g., solar panels, not labeled) may be positioned completely or partially aft of the mast 510 and/or sail 512.

The lidar system 502 may include one or more lasers each configured to emit a pulsed laser beam. In some embodiments, the lidar system 502 may be configured to sweep the pulsed laser beam through a corresponding measurement cone. For example, as illustrated in FIG. 5B, the pulsed laser beam may be swept around a vertical axis 516 such that the measurement cone 504 may be oriented vertically. In the example of FIG. 5B, the mast 510 and/or the sail 512 may occlude a segment of the measurement cone 504. The segment of the measurement cone 504 may have a sweep angle 518 of 30 degrees or less, such as less than 25, 20, 15, 10, or 5 degrees. The lidar system 502 may be placed as close to the mast 510 as possible but not so close that more than a small segment of the measurement cone 504 (e.g., a segment having a sweep angle of 30 degrees or less) is occluded. Winds along the direction of the occluded segment may still be measured by computing wind speed from the non-occluded portions of the measurement cone 504.

Alternatively, as illustrated in FIG. 5C, the pulsed laser beam may be swept around a tilted axis 520 that is tilted fore of the vertical axis 516 by an angular tilt 522 of 30 degrees or less, such as less than 25, 20, 15, 10, or 5 degrees, such that the measurement cone 506 is tilted from vertical. The tilted axis 520 may instead be titled aft of the vertical axis 516 with angular tilt 522 of 30 degrees or less, such as 25, 20, 15, 10, or 5 degrees, if the lidar system 502 is positioned aft of the mast 510 and the sail 512. In the example of FIG. 5C, the mast 510 and the sail 512 do not occlude any portion of the measurement cone 506, and the lidar system 502 may further include a control unit to compensate for tilt of the tilted axis 520 in measurements generated by the lidar system 502.

In some embodiments, the lidar system 502 may include multiple lasers configured to emit multiple pulsed laser beams. The pulsed laser beams may have optical paths that are fixed relative to the autonomous sailing vessel 500 and that lie on, e.g., the measurement cone 504 having a vertical orientation. In this example, none of the pulsed laser beams are swept, rather optical paths of the pulsed laser beams are fixed and lie in or on the measurement cone 504. In this example, the mast 510 and the sail 512 may occlude a segment of the measurement cone 504. However, the lasers may be arranged such that none of the optical paths of the pulsed laser beams are occluded by the mast 510 or the sail 512.

Some embodiments of the autonomous sailing vessels described herein may alternatively or additionally conduct acoustic monitoring missions. In these and other embodiments, the autonomous sailing vessels may include an acoustic sensor, such as a hydrophone.

Marine mammals interact regularly with humans in marine environments. As ocean and marine resources are exploited for food production, resource extraction, offshore wind or wave energy production, or for other purposes, the interactions become more common and often more hazardous to endangered marine mammals. Underwater acoustic listening stations are regularly deployed for marine mammal detection. These can be deployed on stationary buoys, or towed by mobile surface or mobile underwater craft.

Acoustic underwater listening stations generate vast quantities of acoustic data, usually time histories of pressure variations in the water whose origin is marine mammal vocalizations. As used herein, acoustic information broadly includes a potentially much wider frequency range than human beings are typically able to hear. Marine mammal vocalizations range from, e.g., 10 hertz (Hz) to 100 kilohertz (kHz), which is a much wider range than normal human hearing of about 20 Hz to 20 kHz.

Converting the vast amount of acoustic data into useful information may involve filtering the data and transforming it from the time domain to a different dual domain. One common dual domain is frequency, but other transformations into various kinds of wavelets, beamlets, ridgelets, vaguelettes, eigen-wavelets, etc. are possible. More generally, there are algorithmic means of identifying the specific marine mammal species that is the source of a particular vocalization detected by an underwater acoustic listening device.

Computational capability to carry out such algorithms may be limited by available energy sources, such as the batteries used to power long-term buoy-based listening stations. Limits on computational capability generally imply limits on the fidelity of, or the reliability in the identification of the particular species by purely computational algorithmic means. In such cases, merely identifying that a signal is possibly a marine mammal vocalization may be all that is available at the listening station. The candidate vocalization may then snipped out of the full time history and communicated to land-based stations where well-trained humans make the high reliability identification of the particular species responsible for the signal.

Another disadvantage of existing listening stations is that they are either stationary like a buoy or very expensive to operate if mobile like a manned ship.

Some embodiments described herein may include a low cost, unmanned, mobile listening platform in the form of an autonomous sailing vessel that has enough power and energy onboard to process the volumes of data resulting from marine mammal monitoring while characterizing in an automated algorithmic way the likely species source of a vocalization.

Some autonomous sailing vessels described herein may carry many tens of kilograms of payload while supplying many tens of Watts of continuous power. Such autonomous sailing vessels may also include one or more acoustic sensors and/or acoustic sensor packages that may listen for underwater acoustic signals in the frequency range of marine mammal vocalizations or other frequency ranges of interest.

A particular challenge in deploying autonomous mobile marine platforms for listening to underwater marine mammal acoustic signals and/or other acoustic signals is the noise of the platform itself. Most propulsion systems—usually electric motors, reciprocating engines, or even underwater hydrodynamic "swimming" systems—generate too much intrinsic noise to be useful for passive marine mammal monitoring. Further, all mobile platforms have some noise induced by surface heave and wave action.

A relatively small autonomous sailing vessel such as described herein, e.g., with a length of about 12 feet, beam of about 6 feet, and a weight of about 400 pounds (or a length of about 16 feet, a beam of about 10 feet, and a weight of about 700 pounds), may provide an acoustically quiet platform to successfully tow hydrophone systems and/or other acoustic sensors for acoustic monitoring. Further, such autonomous sailing vessels as described herein have adequate power to carry out the computational tasks associated with identification of particular species from long-term time histories of acoustic signals.

Accordingly, at least one embodiment of an autonomous sailing vessel described herein may include an acoustic sensor, a processor device, and an electrical power storage device. The acoustic sensor may be coupled to the hull of the autonomous sailing vessel and may be configured to generate a data signal that represents an underwater acoustic signal.

The acoustic sensor may be directly or indirectly coupled to the hull. In an example in which the acoustic sensor is directly coupled to the hull, the acoustic sensor may use the hull itself as a resonating body. Alternatively, the acoustic sensor may be indirectly coupled to the hull, e.g., via a towing line and/or other intermediate structure or devices between the acoustic sensor and the hull and the acoustic sensor, e.g., a hydrophone, may be towed by the autonomous sailing vessel.

The processor device may be included in, may include, and/or may correspond to the control unit or control computer described elsewhere herein. The processor device may be communicatively coupled to the acoustic sensor and may be configured to analyze the data signal to identify a marine mammal vocalization from the underwater acoustic signal and to identify a corresponding marine mammal species responsible for the marine mammal vocalization. The electrical power storage device may be coupled to the hull and may be electrically coupled to the processor device and may be configured to power the processor device.

The processor device may be configured to analyze the data signal to identify marine mammal vocalizations within a range of, e.g., 10 Hz to 100 kHz.

The autonomous sailing vessel may further include a renewable energy generator, such as one or more solar panels, coupled to the hull and electrically coupled to the electrical power storage device and configured to generate energy to charge the electrical power storage device.

The autonomous sailing vessel may further include a transmitter communicatively coupled to the processor device and configured to transmit an indication to one or more nearby marine platforms that one or more marine mammals of the identified corresponding marine mammal species have been detected in a vicinity of the autonomous sailing vessel.

The processor device may be further configured to detect position and range of one or more individuals of a particular marine mammal species from the underwater acoustic signal and track the position as it varies with time.

Accordingly, some embodiments described herein may offer the possibility of engaging in new types of previously impossible missions. For example, it may be possible with one or more of the autonomous sailing vessels with listening capabilities as described herein to establish a network of multiple such autonomous sailing vessels in areas where construction or site assessment is taking place for offshore wind energy production, offshore oil and gas production, or commercial marine shipping. When marine mammals are detected, one or more of the autonomous sailing vessels may broadcast a warning to working ships in the area. For particularly susceptible marine species, the signal may alert nearby ships to change work patterns so as to protect susceptible species. When the susceptible species are no longer detected as present, the work may revert to previous patterns.

Work patterns that may be altered based on the presence or absence of particular species may be work patterns that generate underwater acoustic energy that may be sufficient to be harmful to, or detrimental to underwater marine species. Such acoustic energy may be from steady-state vibrations such as due to reciprocating rotating machinery like engines or pumps. It also may be from short bursts of acoustic energy such as from rock breaking detonations or similar shock events. Here, the work patterns that may be altered may generally encompass all activities that may generate acoustic noise signatures that are harmful or detrimental to underwater marine species.

Work patterns that may be altered may also include work patterns that may be physically harmful to underwater marine species such as ships impacting marine species or propellers cutting or injuring underwater marine species. Thus, the work patterns that may be altered may alternatively or additionally include any work pattern that may generate harmful physical assault by contact with underwater marine species.

Further, the mobile nature of autonomous marine mammal monitoring platforms, such as some of the autonomous sailing vessels with listening capabilities as described herein, makes them capable of changing position in response to the marine mammal vocalization. Thus, some embodiments described herein may include one or more autonomous sailing vessels in effect following marine mammal groups as they make normal routine movements or even following migration patterns. Multiple mobile autonomous marine mammal monitoring platforms detecting the same signal can locate specific locations of particular individuals and even attempt to track them.

Further, the mobile autonomous marine mammal monitoring platforms need not be equipped with only acoustic monitoring equipment. They may be equipped with optical camera systems sensitive to visual or infrared spectral regions. With the ability to detect and locate particular marine mammal individuals, it may be possible to record optical sightings as well as vocal acoustic signals.

Some embodiments of the autonomous sailing vessels described herein may alternatively or additionally include a stabilizer tank that may be used to reduce a likelihood of the autonomous sailing vessels capsizing. Such a stabilizer tank may be referred to as an anti-capsize stabilizer tank. Some embodiments of the autonomous sailing vessels described herein include catamarans or other type vessels with one or more stabilizer tanks.

Catamarans have advantages and disadvantages over more common monohull sailing vessels. Catamarans are generally faster and lighter than monohulls, but they may also be more prone to capsize as there is little weight below the waterline, and hence little weight to provide a righting moment when they are aggressively heeled over.

Because of their advantages, catamarans may be used for both manned and autonomous sailing vessels. Some methods and systems for righting capsized catamarans include actively changing the location of the center of gravity of the catamaran relative to its center of buoyancy. Some methods and systems for increasing stability of catamarans may include adding heavy center keels or adding water ballast in the catamaran's hulls.

Existing methods and systems to increase stability of catamarans suffer from complication (e.g., pumps and plumbing to selectively add and remove water inside hulls) or performance degradation (e.g., added drag from center keels). Some embodiments described herein increase stability of catamarans implemented as autonomous sailing vessels in a simple manner with little weight that does not degrade hydrodynamics of the catamarans in normal operating conditions.

In high wind conditions when capsize is imminent, in a manned or unmanned catamaran, wind may be spilled from the sail to reduce the loads on the structure from the wind. Flexible sails may also be proactively reefed to further reduce wind loads and as a result reduce the magnitude of an overturning moment. In an unmanned catamaran, or a catamaran with a rigid wing sail, it may not be possible to reef the sail to reduce wind loads.

As an example, consider a small catamaran such as the autonomous sailing vessel 200 of FIG. 2. The catamaran of FIG. 2 has the sail 230 that is a rigid wing sail, the hulls 210 that are pontoon hulls, and the connector structure 250 that connects the hulls 210. The center of gravity of the catamaran of FIG. 2 without heavy keel weights may be well above the water line. In high wind conditions, this high center of gravity can result in the catamaran's instability and tendency to capsize.

At least one embodiment described herein involves adding capsize-stabilizing ballast to the catamaran only when needed. For example, a stabilizer tank may be mounted to the connector structure 250 of the catamaran well above the water line. The stabilizer tank may be lightweight and aerodynamic. For example, the stabilizer tank may be made of welded aluminum or fiberglass and may be aerodynamically shaped so that it does not add significantly to the weight or the wind drag of the catamaran. The stabilizer tank may be made of a material with specific gravity higher than the water in which the catamaran is sailing. In normal operation (not heavy weather), the stabilizer tank may be empty of water or substantially empty of water (e.g., 90% empty of water) and may be tucked up under or into the connector structure 250 and at least partially or completely out of the water.

In heavy weather conditions, e.g., either high wind or high waves or both, the empty stabilizer tank may be lowered into the water, e.g., through one or both of translation or rotation of the tank relative to the connector structure 250 and/or hull(s) 210. The stabilizer tank may have holes formed on or near a location of first contact of the stabilizer tank with the water line, such as at an aft end or bottom end of the stabilizer tank. After the aft end or other location of the stabilizer tank that includes the holes is in contact with the water, the tank may begin to fill with water as the water line reaches and/or exceeds the locations of the holes. The weight of the empty stabilizer tank shell may be greater than the weight of the water that the empty stabilizer tank (not including the internal volume) displaces when the holes are at or under the water line, so the stabilizer tank will sink as it fills with water. In some embodiments, the stabilizer tank may include a hole near the top of the stabilizer tank so that during filling with water, it is easy for the air in the stabilizer tank to escape.

After the stabilizer tank is fully deployed, the tank may be oriented so its long axis is approximately perpendicular to the surface of the water surrounding the catamaran and filled with water to a same height as the surrounding water line. Once fully deployed and filled with water to the waterline, the stabilizer tank (and water) may add significantly to the inertia of the catamaran as it moves under the action of waves and wind. This added inertia may result in smaller linear and angular accelerations compared to the catamaran with the undeployed stabilizer tank under the same wind and wave loads. Gusts of short duration wind will be less likely to capsize the catamaran due to the larger inertia moving with the catamaran.

Figure 6:
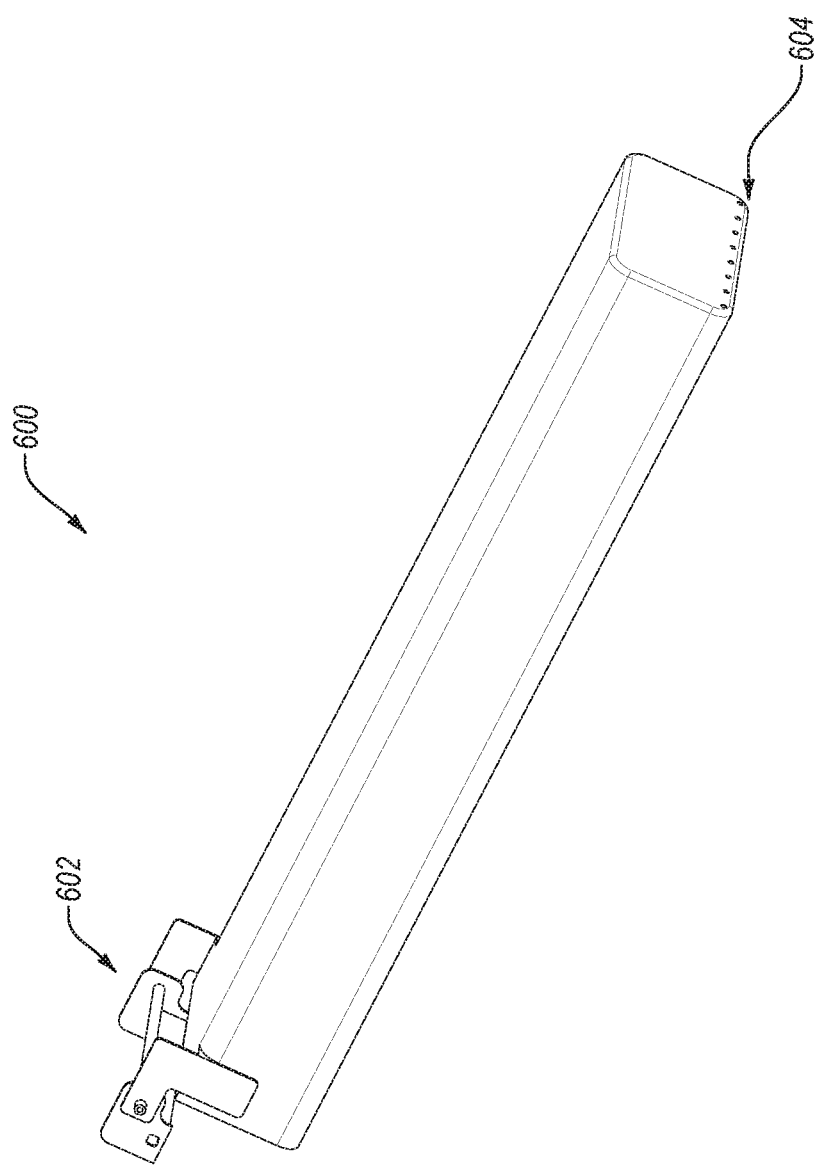
FIG. 6 illustrates an example stabilizer tank that may be included in an autonomous sailing vessel, such as an autonomous sailing catamaran.

FIG. 6 illustrates an example stabilizer tank 600 that may be included in an autonomous sailing vessel, such as an autonomous sailing catamaran, arranged in accordance with at least one embodiment described herein. As illustrated, the stabilizer tank 600 is elongate with a hinge coupler 602 at one end along a long axis of the stabilizer tank 600 and multiple holes 604 formed at an opposite end along the long axis of the stabilizer tank 600. The stabilizer tank 600 may include at least one hole (not illustrated in FIG. 6) at or near the end with the hinge coupler for air to exit the stabilizer tank 600 as the stabilizer tank fills with water through the holes 604 during deployment.

In the example of FIG. 6, the stabilizer tank 600 is configured to be rotatably coupled to and/or beneath a connector structure (such as the connector structure 250 of FIG. 2) of a catamaran through the hinge coupler 602. The stabilizer tank 600 may be rotatable relative to the connector structure and/or hulls of the catamaran between a stowed position and a deployed position. In the stowed position, the stabilizer tank 600 may be arranged generally parallel to a bottom of the connector structure and a surface of the water and substantially or completely out of the water. In the deployed position, the stabilizer tank 600 may be rotated relative to the stowed position by 45 degrees or more, such as 90 degrees, such that some or all of the stabilizer tank 600 is positioned beneath the water line and filled with water through the holes 604 to the water line. In other embodiments, instead of being rotatably coupled to the catamaran, the stabilizer tank may be slidably coupled to the catamaran to, e.g., translate up and down between stowed and deployed positions.

Figure 7A:
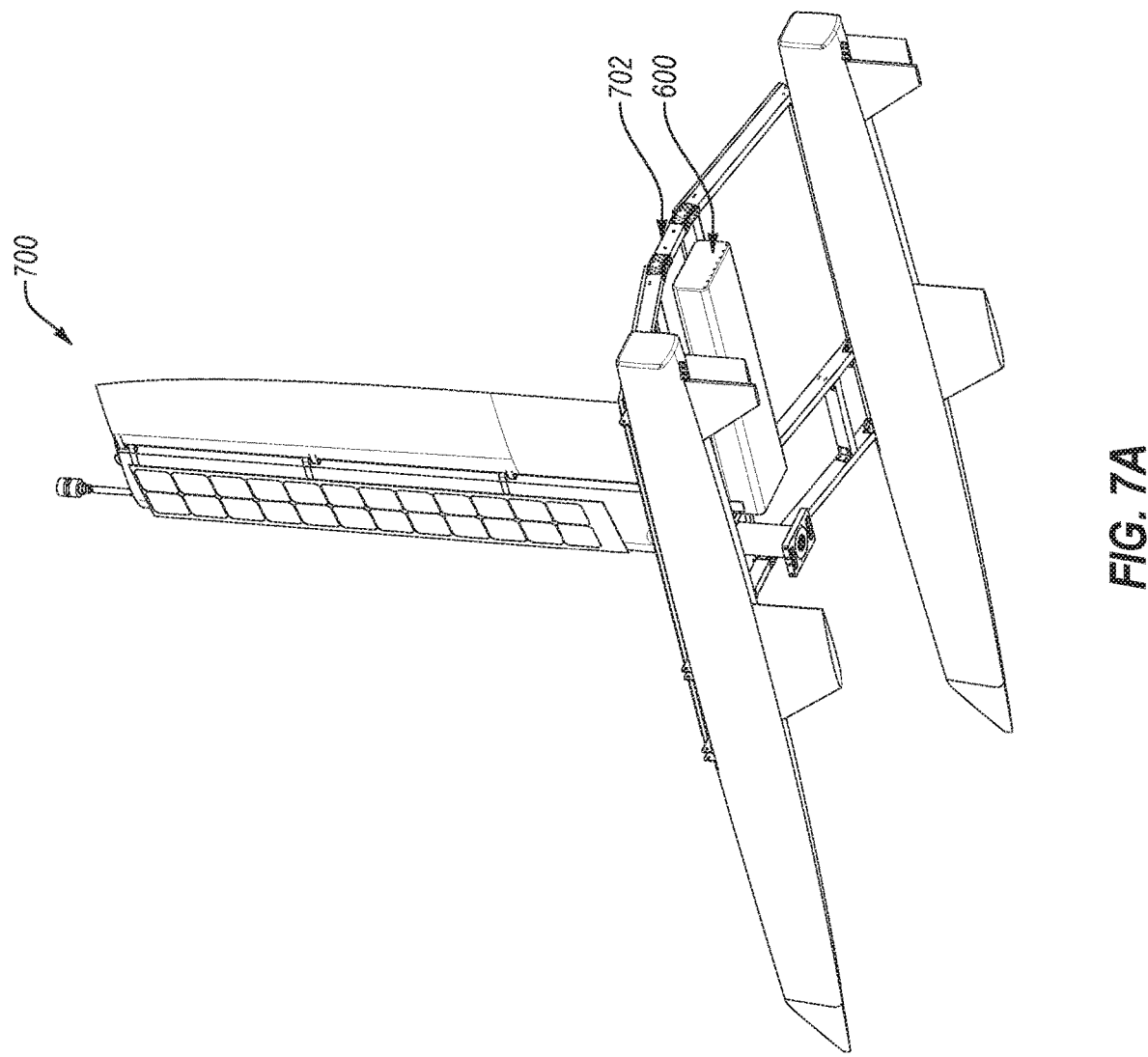
Figure 7B:
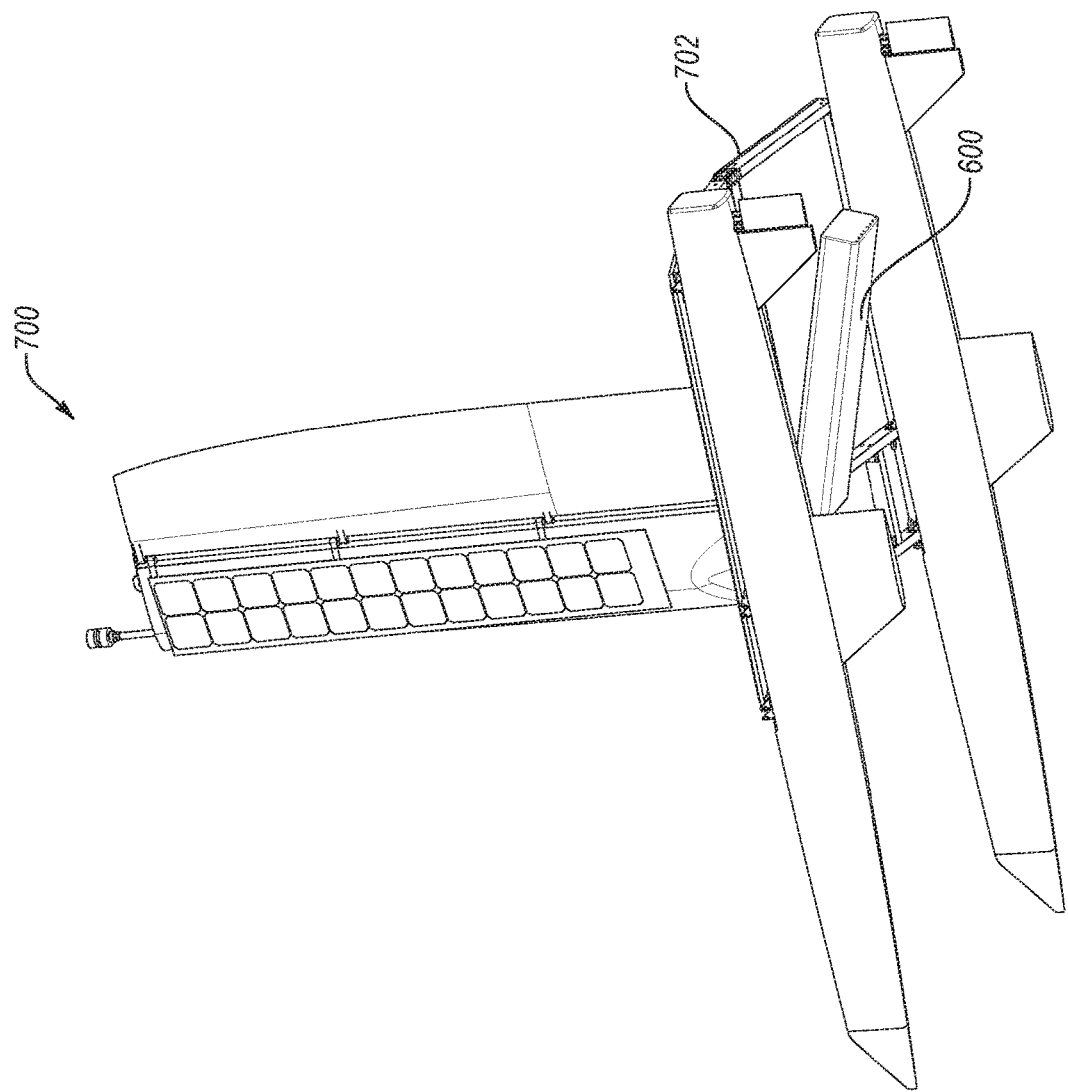
Figure 7C:
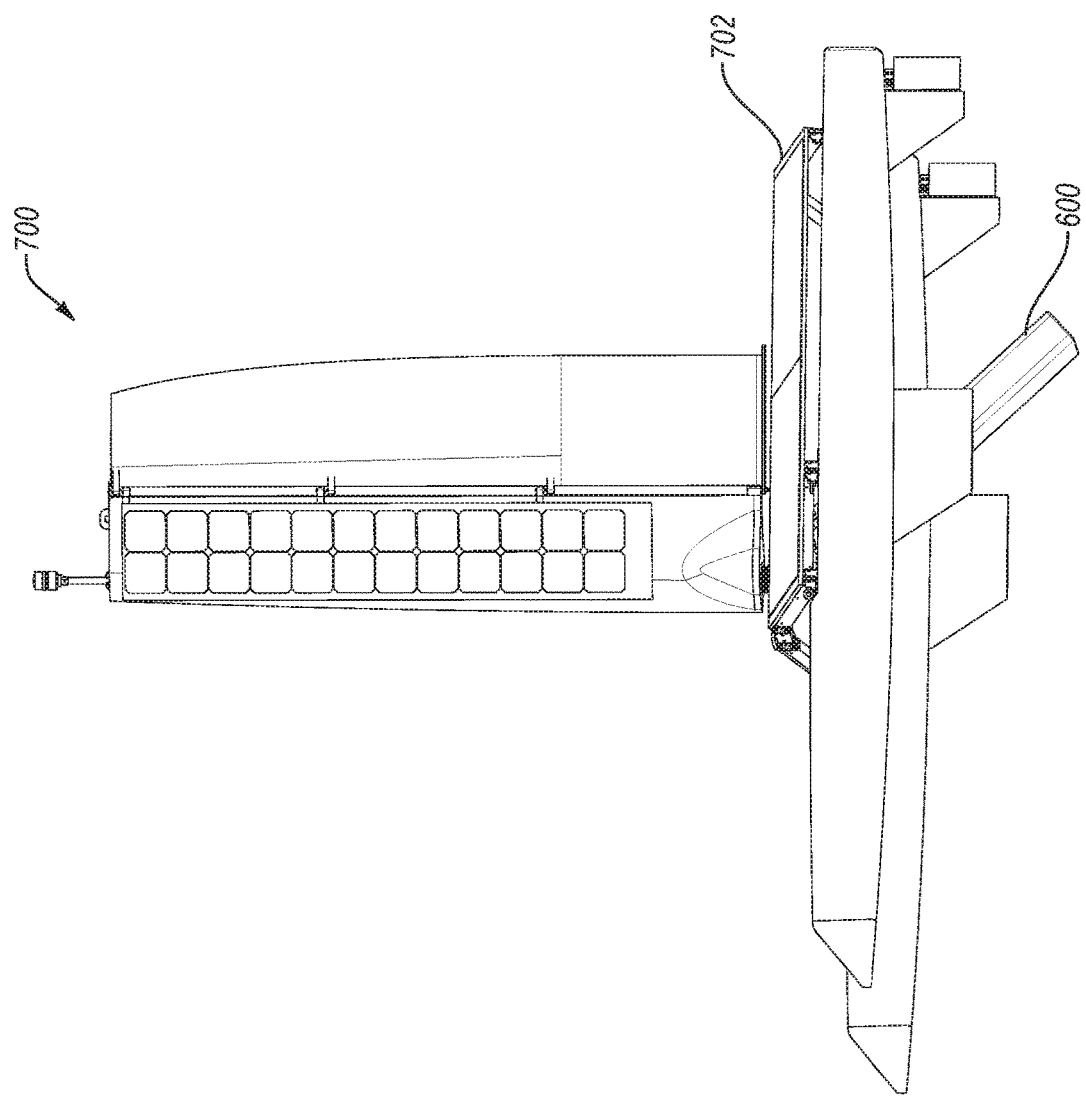

FIGS. 7A-7F illustrate an example catamaran 700 that includes the stabilizer tank 600, arranged in accordance with at least one embodiment described herein. The catamaran further includes a connector structure 702 and various other components (not labeled for simplicity). FIG. 7A illustrates the stabilizer tank 702 in a stowed position and FIGS. 7D-7F illustrate the stabilizer tank 702 in a deployed position. FIGS. 7B and 7C illustrate the stabilizer tank 702 in various partially deployed positions.

In FIG. 7A, the stabilizer tank 600 is rotatably coupled through the hinge coupler 602 (FIG. 6) to the connector structure 702 near a fore-aft center of gravity of the catamaran 700, with the opposite end of the stabilizer tank 600 that includes the holes 604 (FIG. 6) arranged generally aft when the stabilizer tank 600 is in the stowed position of FIG. 7A. The location of connection of the stabilizer tank 600 to the connector structure 702 may also be approximately in the center of aerodynamic and opposing hydrodynamic sailing loads of the catamaran 700.

In heavy weather conditions, e.g., either high wind or high waves or both, the stabilizer tank 600 may be rotated from the stowed position of FIG. 7A to the deployed position of FIGS. 7D-7F, passing through the partially deployed positions of FIGS. 7B and 7C. In more detail, from FIG. 7A to 7B, the stabilizer tank 600 pivots about its upper leading edge to move from the stowed position of FIG. 7A to the partially deployed position of FIG. 7B. The aft end of the stabilizer tank 600 is lowered just to the surface of the water in the partially deployed position of FIG. 7B.

The holes 604 (FIG. 6) are formed on or near the aft end of the stabilizer tank 600 at or near the location of first contact with the water line. Thus, after the aft end of the stabilizer tank 600 is in contact with the water, the stabilizer tank 600 may begin to fill with water as the water line reaches and/or exceeds the locations of the holes. The weight of the empty stabilizer tank 600 may be greater than the weight of the water that the empty stabilizer tank 600 (not including the internal volume) displaces when the holes are at or under the water line, so the stabilizer tank 600 will sink as it fills with water.

From FIG. 7B to FIG. 7C, the stabilizer tank 600 further pivots about its upper leading edge to move from the partially deployed position of FIG. 7B to the partially deployed position of FIG. 7C in which the stabilizer tank 600 may be partially sunk below the water line. In this partially deployed position of FIG. 7C, a significant fraction of the stabilizer tank 600 is now below the surface of the water in which the catamaran 700 is sailing. In this state, the water level inside the stabilizer tank 600 may be approximately the same as the water level surrounding the stabilizer tank 600.

From FIG. 7C to FIG. 7D, the stabilizer tank 600 further pivots about its upper leading edge to move from the partially deployed position of FIG. 7C to the fully deployed position of FIG. 7D. When the stabilizer tank 600 is fully deployed as illustrated in FIG. 7D, the stabilizer tank 600 may be oriented so its long axis is approximately perpendicular to the surface of the water surrounding the catamaran 700. The rotatable connection of the stabilizer tank 600 to the connector structure 702 in the fully deployed position may ensure the stabilizer tank 600 will have the same roll and yaw motion as the catamaran 700. However, the stabilizer tank 600 may have a different pitch motion than the catamaran 700 if the stabilizer tank 600 is free to rotate relative to the catamaran 700. Accordingly, an additional means of stabilizing the stabilizer tank 600 may be included so that once the stabilizer tank 600 is fully deployed, it is locked to the catamaran 700 so the pitch motion of the catamaran 700 and the stabilizer tank 600 are also the same. For example, an actuator coupled to a latch may be operated by the catamaran's 700 control system to selectively move the latch between a latched position in which the stabilizer tank 600 in the deployed position of FIG. 7D is locked to the catamaran 700 and an unlatched position in which the stabilizer tank 600 can rotate in pitch about its axis of rotation relative to the catamaran 700.

When fully deployed, the filled stabilizer tank 600 may add significantly to the inertia of the catamaran 700 as it moves under the action of waves and wind. The added inertia will result in smaller linear and angular accelerations compared to the catamaran 700 with the undeployed tank 600 (FIG. 7A) under the same wind and wave loads. Gusts of short duration wind will be less likely to capsize the catamaran 700 due to the larger inertia moving with the catamaran 700.

FIG. 7E is a rear (e.g., aft) view of the catamaran 700 with the stabilizer tank 600 in the fully deployed position. FIG. 7E also explicitly depicts a water line 704. The water line 704 is the same inside and outside the stabilizer tank 600 after the stabilizer tank 600 is fully deployed and filled to the water line 704.

FIG. 7F shows the same fully deployed configuration of the stabilizer tank 600 of FIG. 7E with the catamaran 700 aggressively heeled over. The center of gravity of the catamaran 700 (along the port-to-starboard centerline) rises higher above the water line 704 than in the unheeled position in FIG. 7E. The stabilizer tank 600 also rises partially out of the water, lifting some of the water contained inside the stabilizer tank 600. In this aggressively heeled position, the stabilizer tank 600 will begin to drain from the stabilizer tank 600. The size of the holes 604 (FIG. 6) in the stabilizer tank 600 may be carefully chosen so that the time to fill or drain the stabilizer tank 600 is much longer than the time to heel or capsize the catamaran 700. For example, a turbulent wind gust that may capsize the catamaran 700 may act on the catamaran 700 for between 0.5 and 2 seconds. On the other hand, the holes 604 in the stabilizer tank 600 may be sized so that it takes perhaps 0.5 to 2 minutes to fill or drain the stabilizer tank 600. Because of the significant difference in these time scale ranges, during a wind gust induced heeling event, the stabilizer tank 600 is effectively as full through the entire heeling event as it was before the wind gust caused the heeling event.

If the catamaran 700 heels over even more than shown in FIG. 7F, the stabilizer tank 600 lifts further out of the surrounding water. The weight of the water contained inside the stabilizer tank 600 provides a restoring moment to counter the heeling moment from the wind and the restoring moment helps to prevent capsize of the catamaran 700.

Under normal operation, the stabilizer tank 600 may be stowed as illustrated in FIG. 7A. In the event of expected heavy weather when there is a modest or high risk of capsizing the catamaran 700, the stabilizer tank 600 may be deployed and filled as illustrated in and described with respect to FIGS. 7D and 7E. With proper planning, this gives sufficient time for the stabilizer tank 600 to fill and help to stabilize the catamaran 700. At the end of the heavy weather period, the stabilizer tank 600 may be retracted and restored to the stowed position of FIG. 7A. As the tank is retracted, the water inside slowly drains. The retract duration can be chosen to be approximately the same as the tank filling or emptying time.

In some embodiments, the stabilizer tank 600 may be actively filled, rather than relying on the passive filling technique described above. In this case, a pump may be included in the catamaran 700 to pump water into the stabilizer tank 600 as the stabilizer tank 600 is deployed and to pump water out of the stabilizer tank 600 as it is retracted. In some embodiments, air may be pumped into the top of the stabilizer tank 600 to push the water out during retraction rather than directly pumping the water itself.

FIG. 7F and the associated discussion shows how the deployed stabilizer tank 600 may help to stabilize the catamaran 700 from capsizing with a rolling motion. If the stabilizer tank 600 is latched into the deployed position of FIG. 7D, the filled stabilizer tank 600 will also help stabilize the catamaran 700 from capsizing with a pitching motion.

The stabilizer tank 600 of FIGS. 6-7F may be roughly prismatic. A shape of the stabilizer tank 600 may be modified to put a larger volume below the water line 704 when deployed than a prismatic shape allows. As shown in FIG. 7F, some of the stabilizer tank 600 may remain below the surrounding waterline in the heeled position. It may be optimal (for example to reduce weight in lower extreme wind regions) to have a smaller, lighter stabilizer 600 than what is shown. On the other hand, in regions with higher extreme wind events, it may be advantageous to have a larger volume stabilizer tank and/or a deeper stabilizer tank. With the description of the concept here, one can easily modify the dimensions of the stabilizer tank 600 to optimize for a particular catamaran, with manned or unmanned, in a particular set of heavy weather conditions.

Figure 8B:
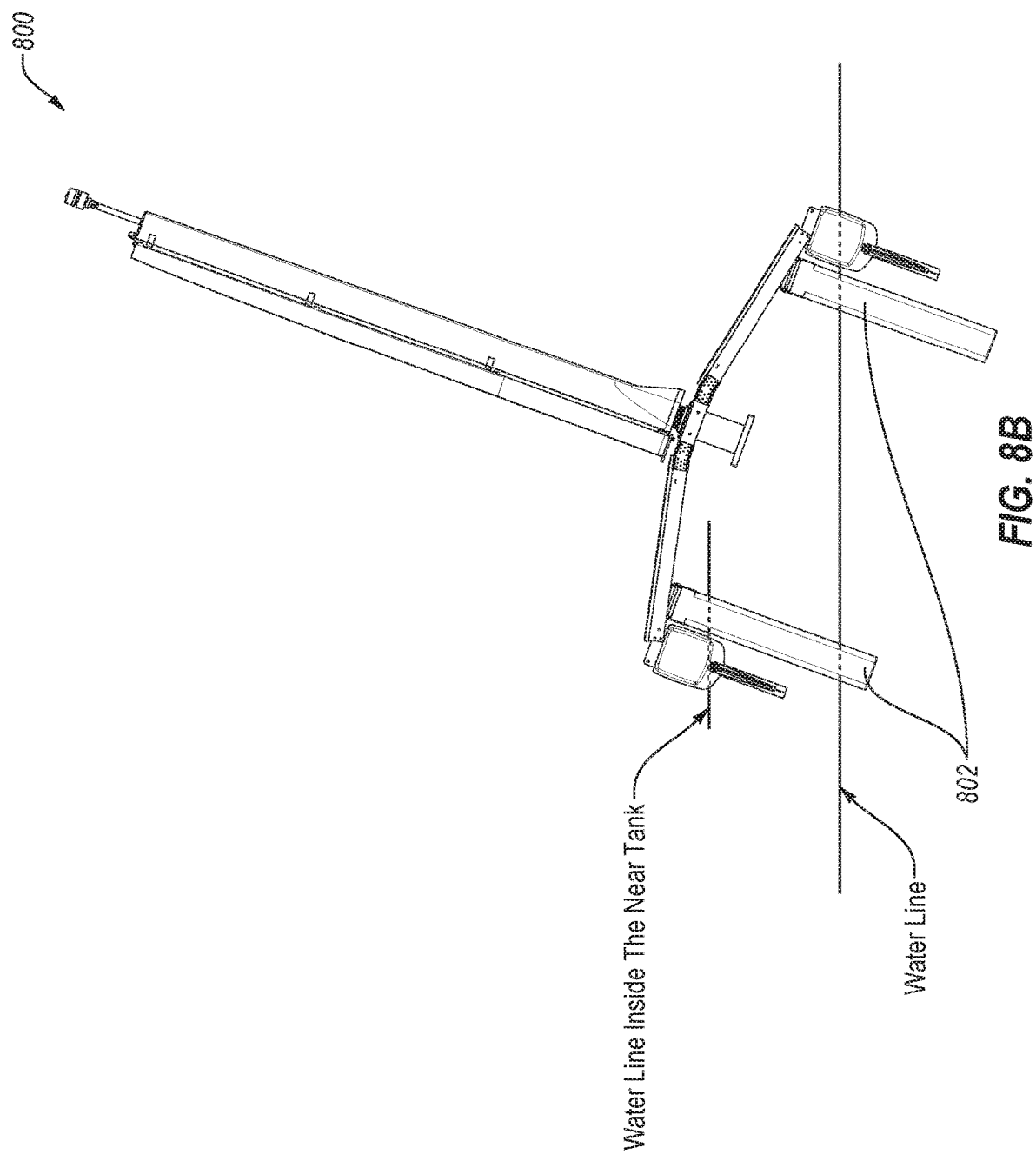

FIGS. 8A and 8B illustrate an example catamaran 800 that includes two stabilizer tanks 802, arranged in accordance with at least one embodiment described herein. Each of the stabilizer tanks 802 is attached to the catamaran 800 at or near a corresponding hull of the catamaran 800.

The stabilizer tanks 802 are illustrated in fully deployed positions and may, similar to the stabilizer tank 600 of FIGS. 7A-7F, be rotatable between fully deployed positions and stowed positions. The stabilizer tanks 802 may be integrated into the hulls of the catamaran 800 or attached to a connector structure of the catamaran 800, e.g., near each corresponding hull. In either case, each stabilizer tank 802 may be deployed as described for the stabilizer tank 600 of FIGS. 7A-7F when heavy weather is expected, then stowed when heavy weather has passed.

FIG. 8B illustrates the catamaran 800 with the stabilizer tanks 802 fully deployed and the catamaran 800 in a heeled position. The individual stabilizer tanks 802 attached generally near the hulls may provide an advantage in heeling winds or waves because they may offer more restoring moment due to water in the stabilizer tank 802 being lifted above the surrounding water line. More water is lifted providing more force for the restoring moment, and the moment arm from the stabilizer tank's 802 water to the far (buoyant) hull for the resulting force is larger, both contributing to a larger restoring moment.

Accordingly, embodiments of the autonomous sailing vessels described herein (or of manned sailing vessels) may include one or more stabilizer tanks movable relative to one or more hulls. The stabilizer tank may be movable between a stowed position in which the stabilizer tank is substantially above a waterline and a deployed position in which the stabilizer tank is substantially below the waterline. Substantially above may include any configuration in which the stabilizer tank is at least 50% above the waterline. Substantially below the waterline may include any configuration in which the stabilizer tank is at least 50% below the waterline.

The stabilizer tank may be rotatable between the stowed position and the deployed position. Alternatively or additionally, the stabilizer tank may be translatable between the stowed position and the deployed position.

Each stabilizer tank may define multiple holes that extend from a hollow interior of the stabilizer tank to a surrounding environment. The holes may facilitate fluid exchange between the hollow interior and the surrounding environment. The holes may be located at or near an area of first contact of the stabilizer tank with water when the stabilizer tank is moved from the stowed position toward the deployed position.

The area of first contact of the stabilizer tank may be at or near an aft end of the stabilizer tank when the stabilizer tank is in the stowed position and the stabilizer tank may be at least partially fillable with water. The stabilizer tank may be configured to at least partially fill with water in response to being positioned in the deployed position and without use of a pump. The stabilizer tank that is at least partially filled with water when in the deployed position may be configured to substantially drain the water in response to moving from the deployed position to the stowed position and without use of a pump.

The autonomous sailing vessel may also include a latch configured to selectively secure the stabilizer tank in the deployed position, e.g., so the pitch, roll, and/or yaw motion of the stabilizer tank is the same as the pitch, roll, and/or yaw motion of the autonomous sailing vessel.

The autonomous sailing vessel may further include an electric motor attached to at least one of the hull and the connector structure. The electric motor may be configured to move the stabilizer tank between the stowed position and the deployed position. The autonomous sailing vessel may further include at least one solar panel attached to at least one of the hull and the connector structure, the at least one solar panel configured to generate electricity to operate the electric motor.

Some embodiments described herein may include a method to operate an autonomous sailing vessel. The method may include determining a current heading of the autonomous sailing vessel, where the autonomous sailing vessel includes a hull, a mast mechanically coupled to the hull, a sail mechanically coupled to the mast, and a rudder mechanically coupled to the hull. The method may also include determining a heading error based on a comparison of the current heading to a target heading. The method may also include regulating a heading of the autonomous sailing vessel by actively controlling the rudder without actively controlling the sail.

The method may include detecting a sign and magnitude of forward water speed of the autonomous sailing vessel relative to the water.

The method may include regulating a course of the autonomous sailing vessel by actively controlling the rudder without actively controlling the sail. Regulating the course of the autonomous sailing vessel may include regulating the course of the autonomous sailing vessel at a slower frequency than regulating the heading.

The method may include executing one or more control functions to regulate the heading. The one or more control functions may include at least one of: a proportional control function that has a proportional gain $K_P$; an integral control function that has an integral gain $K_I$; and a derivative control function that has a derivative gain $K_D$. At least one of the proportional gain $K_P$, the integral gain $K_I$, and the derivative gain $K_D$ may vary based on a magnitude and sign of forward water speed of the autonomous sailing vessel and the method may further include detecting the magnitude and sign of the forward water speed and determining a value of at least one of the proportional gain $K_P$, the integral gain $K_I$, and the derivative gain $K_D$ based on the magnitude and sign of the forward water speed.

The at least one of the proportional gain $K_P$, the integral gain $K_I$, and the derivative gain $K_D$ may vary based on wind speed and the method may further include detecting the wind speed and determining a value of at least one of the proportional gain $K_P$, the integral gain $K_I$, and the derivative gain $K_D$ based on the wind speed.

The method may include taking lidar measurements fore or aft of the mast and sail. Taking lidar measurements may include emitting a pulsed laser beam and sweeping the pulsed laser beam through a measurement cone, where the mast and sail occlude a segment of the measurement cone and the segment has a sweep angle of 30 degrees or less. Alternatively, taking lidar measurements may include emitting a pulsed laser beam and sweeping the pulsed laser beam through a measurement cone tilted relative to vertical by 30 degrees or less, where the mast and sail do not occlude any portion of the measurement cone; and compensating for tilt of the measurement cone in the lidar measurements. Alternatively, taking lidar measurements may include emitting multiple pulsed laser beams having optical paths that are fixed relative to the autonomous sailing vessel and that lie on a measurement cone, where the mast and the sail occlude a segment of the measurement cone and none of the optical paths is occluded by the mast and the sail.

The method may include receiving an underwater acoustic signal at an acoustic sensor of the autonomous sailing vessel; generating a data signal at the acoustic sensor that represents the underwater acoustic signal; and analyzing the data signal at the autonomous sailing vessel to identify a marine mammal vocalization from the underwater acoustic signal and to identify a corresponding marine mammal species responsible for the marine mammal vocalization. The method may include transmitting an indication to one or more nearby marine platforms that one or more marine mammals of the identified corresponding marine mammal species have been detected in a vicinity of the autonomous sailing vessel.

The method may include moving a stabilizer tank coupled to the hull between a stowed position in which the stabilizer tank is substantially above a waterline and a deployed position in which the stabilizer tank is substantially below the waterline. Moving the stabilizer tank between the stowed position and the deployed position may include rotating the stabilizer tank between the stowed position and the deployed position; or translating the stabilizer tank between the stowed position and the deployed position. The method may include at least partially filling the stabilizer tank with water while the stabilizer tank is moved from the stowed position to the deployed position and without use of a pump. The method may include at least partially removing water that at least partially fills the stabilizer tank in the deployed position while the stabilizer tank is moved from the deployed position to the stowed position and without use of a pump.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An autonomous sailing vessel, comprising:
  a hull;
  a mast mechanically coupled to the hull;
  a sail mechanically coupled to the mast;
  a rudder mechanically coupled to the hull, wherein both a heading and a course of the autonomous sailing vessel are regulated by actively controlling the rudder;
  a rudder actuator mechanically coupled to the rudder, the rudder rotatable by the rudder actuator relative to the hull to regulate the heading and the course; and
  a control unit communicatively coupled to the rudder actuator and configured to operate the rudder actuator to actively control the rudder, wherein:
    the control unit executes a nested control loop comprising a heading control loop to regulate the heading and a course control loop to regulate the course; and
    the course control loop runs at a slower frequency than the heading control loop.

2. The autonomous sailing vessel of claim 1, further comprising a water velocity sensor mechanically coupled to the hull and configured to determine a sign of forward water speed of the autonomous sailing vessel relative to water, wherein the control unit is communicatively coupled to the water velocity sensor and is configured to operate the rudder actuator to actively control the rudder to regulate the heading responsive to input from the water velocity sensor.

3. The autonomous sailing vessel of claim 2, further comprising a position sensor configured to determine a position of the autonomous sailing vessel, wherein the control unit is communicatively coupled to the position sensor and is configured to operate the rudder actuator to control the rudder to regulate the course responsive to input from the position sensor.

4. The autonomous sailing vessel of claim 2, wherein:
  the control unit executes one or more control functions to regulate the heading; and
  the one or more control functions includes at least one of: a proportional control function that has a proportional gain $K_p$; an integral control function that has an integral gain $K_I$; and a derivative control function that has a derivative gain $K_D$.

5. The autonomous sailing vessel of claim 4, wherein at least one of:
  at least one of the proportional gain $K_p$, the integral gain $K_I$, and the derivative gain $K_D$ varies based on a speed of the autonomous sailing vessel relative to the water, the speed detected by the water velocity sensor;
  a sign of at least one of the proportional gain $K_p$, the integral gain $K_I$, and the derivative gain $K_D$ depends on the sign of the forward water speed of the autonomous sailing vessel; and
  the autonomous sailing vessel further comprises a wind speed sensor configured to determine wind speed relative to the autonomous sailing vessel, wherein at least one of the proportional gain $K_p$, the integral gain $K_I$, and the derivative gain $K_D$ varies based on the wind speed.

6. The autonomous sailing vessel of claim 1, wherein at least one of the heading and the course is regulated by actively controlling the rudder without actively controlling the sail.

7. An autonomous sailing vessel, comprising:
a hull;
a mast mechanically coupled to the hull;
a sail mechanically coupled to the mast;
a rudder mechanically coupled to the hull; and
a lidar system mechanically coupled to the hull, wherein:
the autonomous sailing vessel further comprises a second mast mechanically coupled to the hull and a second sail mechanically coupled to the second mast, the lidar system positioned between the mast and sail spaced apart from the lidar system in a first direction and the second mast and the second sail spaced apart from the lidar system in a second direction opposite the first direction; or
the lidar system is positioned fore or aft of the mast and the sail in close proximity to the mast or sail.

8. The autonomous sailing vessel of claim 7, wherein:
the autonomous sailing vessel comprises the second mast and the second sail;
the lidar system is configured to take measurements on a measurement cone; and
the measurement cone is not occluded by any of the mast, the sail, the second mast, or the second sail.

9. The autonomous sailing vessel of claim 7, wherein:
the lidar system is positioned fore or aft of the mast and the sail in close proximity to the mast or sail;
the lidar system comprises a laser configured to emit a laser beam having an optical path on a measurement cone;
the optical path is fixed with respect to the lidar system and the autonomous sailing vessel;
the lidar system further comprises an additional laser configured to emit a different laser beam having a different optical path on the measurement cone;
the different optical path is fixed with respect to the lidar system and the autonomous sailing vessel;
a segment of the measurement cone is occluded by the mast and/or the sail; and
none of the optical path or the different optical path is occluded by the mast or the sail.

10. The autonomous sailing vessel of claim 7, wherein:
the lidar system is positioned fore or aft of the mast and the sail in close proximity to the mast or sail;
the lidar system comprises a laser configured to emit a laser beam having an optical path;
the pulsed laser beam is swept around a vertical axis to form the measurement cone;
the mast and/or the sail occludes a segment of the measurement cone; and the occluded segment of the measurement cone has a sweep angle of 30 degrees or less.

11. The autonomous sailing vessel of claim 7, wherein:
the lidar system is positioned fore or aft of the mast and the sail in close proximity to the mast or sail;
the lidar system comprises a laser configured to emit a laser beam having an optical path;
the pulsed laser beam is swept around a tilted axis to form the measurement cone;
the tilted axis is tilted fore or aft with an angular tilt relative to vertical of 30 degrees or less;
the mast and/or the sail do not occlude any portion of the measurement cone; and
the lidar system further comprises a control unit to compensate for tilt of the tilted axis in measurements generated by the lidar system.

12. An autonomous sailing vessel, comprising:
a hull;
a mast mechanically coupled to the hull;
a sail mechanically coupled to the mast;
a rudder mechanically coupled to the hull;
an acoustic sensor coupled to the hull and configured to generate a data signal that represents an underwater acoustic signal;
a processor device coupled to the hull and communicatively coupled to the acoustic sensor and configured to analyze the data signal to identify a marine mammal vocalization from the underwater acoustic signal and to identify a corresponding marine mammal species responsible for the marine mammal vocalization; and
an electrical power storage device coupled to the hull and electrically coupled to the processor device and configured to power the processor device.

13. The autonomous sailing vessel of claim 12, wherein the processor device is configured to analyze the data signal to identify marine mammal vocalizations.

14. The autonomous sailing vessel of claim 12, further comprising a transmitter communicatively coupled to the processor device and configured to transmit an indication to one or more nearby marine platforms that one or more marine mammals of the identified corresponding marine mammal species have been detected in a vicinity of the autonomous sailing vessel.

15. An autonomous sailing vessel, comprising:
a hull;
a mast mechanically coupled to the hull;
a sail mechanically coupled to the mast;
a rudder mechanically coupled to the hull; and
a stabilizer tank movable relative to the hull, the stabilizer tank movable between a stowed position in which the stabilizer tank is substantially above a waterline and a deployed position in which the stabilizer tank is substantially below the waterline.

16. The autonomous sailing vessel of claim 15, wherein:
the stabilizer tank is rotatable between the stowed position and the deployed position; or
the stabilizer tank is translatable between the stowed position and the deployed position.

17. The autonomous sailing vessel of claim 15, wherein the stabilizer tank defines a plurality of holes that extend from a hollow interior of the stabilizer tank to a surrounding environment, the plurality of holes facilitating fluid exchange between the hollow interior and the surrounding environment, the plurality of holes located at or near an area of first contact of the stabilizer tank with water when the stabilizer tank is moved from the stowed position toward the deployed position.

18. The autonomous sailing vessel of claim 15, further comprising a latch configured to selectively secure the stabilizer tank in the deployed position.

19. The autonomous sailing vessel of claim 15, further comprising an electric motor attached to at least one of the hull and a connector structure, the electric motor configured to move the stabilizer tank between the stowed position and the deployed position.

* * * * *